(12) United States Patent
Karibe

(10) Patent No.: US 8,886,683 B2
(45) Date of Patent: Nov. 11, 2014

(54) METADATA GENERATION MANAGEMENT DEVICE, METADATA GENERATION SYSTEM, INTEGRATED CIRCUIT FOR MANAGING GENERATION OF METADATA, METADATA GENERATION MANAGEMENT METHOD, AND PROGRAM

(75) Inventor: Tomoyuki Karibe, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 111 days.

(21) Appl. No.: 12/988,100

(22) PCT Filed: Mar. 3, 2010

(86) PCT No.: PCT/JP2010/001450
§ 371 (c)(1),
(2), (4) Date: Oct. 15, 2010

(87) PCT Pub. No.: WO2010/100913
PCT Pub. Date: Sep. 10, 2010

(65) Prior Publication Data
US 2011/0040800 A1  Feb. 17, 2011

(30) Foreign Application Priority Data
Mar. 4, 2009 (JP) .................. 2009-051106

(51) Int. Cl.
| G06F 17/30 | (2006.01) |
| H04N 7/173 | (2011.01) |
| H04N 21/25 | (2011.01) |
| H04N 21/262 | (2011.01) |
| H04N 21/442 | (2011.01) |
| H04N 21/658 | (2011.01) |
| H04N 21/8355 | (2011.01) |
| H04N 21/84 | (2011.01) |

(52) U.S. Cl.
CPC ...... *H04N 7/17336* (2013.01); *G06F 17/30292* (2013.01); *H04N 21/252* (2013.01); *H04N 21/26291* (2013.01); *H04N 21/44204* (2013.01); *H04N 21/6582* (2013.01); *H04N 21/8355* (2013.01); *H04N 21/84* (2013.01)
USPC ........... 707/803; 707/736; 707/758; 707/781; 707/791; 707/802; 707/809; 707/712; 710/1

(58) Field of Classification Search
USPC ......... 707/736, 758, 781, 791, 802–803, 809, 707/812, 999.101–103; 710/1
See application file for complete search history.

(56) References Cited

U.S. PATENT DOCUMENTS

| 2004/0107207 A1* | 6/2004 | Kondo et al. .................. 707/102 |
| 2004/0246376 A1 | 12/2004 | Sekiguchi et al. |
| 2006/0112124 A1 | 5/2006 | Ando et al. |
| 2006/0114762 A1* | 6/2006 | Kanai ......................... 369/30.09 |
| 2007/0061378 A1 | 3/2007 | Lee et al. |
| 2008/0031475 A1* | 2/2008 | Goldstein ..................... 381/151 |

(Continued)

FOREIGN PATENT DOCUMENTS

| EP | 1 482 735 | 12/2004 |
| JP | 2001-111910 | 4/2001 |

(Continued)

OTHER PUBLICATIONS

International Search Report issued Mar. 30, 2010 in International (PCT) Application No. PCT/JP2010/001450.

*Primary Examiner* — Syling Yen
(74) *Attorney, Agent, or Firm* — Wenderoth, Lind & Ponack, L.L.P.

(57) ABSTRACT

A metadata generation management device includes a count unit that measures a playback amount of content, which is an amount of content that has been played back; and a control unit that controls whether to output an instruction for generating metadata indicating characteristics of the content, based on the playback amount of the content.

16 Claims, 14 Drawing Sheets

(56) References Cited

U.S. PATENT DOCUMENTS

2008/0065659 A1 3/2008 Watanabe et al.
2010/0115025 A1 5/2010 Maegawa et al.

FOREIGN PATENT DOCUMENTS

| | | |
|---|---|---|
| JP | 2003-304473 | 10/2003 |
| JP | 2006-109160 | 4/2006 |
| JP | 2007-12013 | 1/2007 |
| JP | 2007-82231 | 3/2007 |
| JP | 2008-5265 | 1/2008 |
| JP | 2008-70959 | 3/2008 |
| JP | 2008-242740 | 10/2008 |
| WO | 2008/129600 | 10/2008 |
| WO | 2009/026398 | 2/2009 |

* cited by examiner

FIG. 2A
Content table

| Identification information | Content data |
|---|---|
| 1 | Content data A |
| 2 | Content data B |
| 3 | Content data C |
| ... | ... |

FIG. 2B
Metadata table

| Identification information | Metadata | |
|---|---|---|
| 1 | First Shrine Visit of New Year, 5:30, mpeg, 2009/1/1 0:30 | Faces of people |
| 2 | Overseas Trip This Year!, 4:45, avi, 2009/1/1 0:40 | Plants, cars, buildings |
| 3 | My Cat, 0:59, mpeg, 2009/1/1 0:42 | — |
| ... | ... | ... |

FIG. 2C
Thumbnail image table

| Identification information | Thumbnail image data |
|---|---|
| 1 | Thumbnail image data A |
| 2 | Thumbnail image data B |
| 3 | Thumbnail image data C |
| ... | ... |

FIG. 2D
Distribution log table

| Date and time | IP address | URL | Range |
|---|---|---|---|
| 2009/1/1 0:32 | xxx.xxx.xxx.10 | http://a○.b×.com/1··· | 0:00-3:25 |
| 2009/1/1 0:34 | xxx.xxx.xxx.1 | http://a○.b×.com/1··· | 0:00-0:25 |
| 2009/1/1 0:45 | xxx.xxx.xxx.20 | http://a○.b×.com/2··· | 0:00-1:12 |
| ... | ... | ... | ... |

FIG. 3A

Playback amount table

| Identification information | Playback count |
|---|---|
| 1 | 999 |
| 2 | 2200 |
| 3 | 499 |
| ... | ... |

FIG. 3B

Generation log table

| Identification information | Processed information |
|---|---|
| 1 | 1 |
| 2 | 2 |
| ... | ... |

FIG. 8A

Playback amount table

| Identification information (51) | Playback range (54) | Playback time (55) |
|---|---|---|
| 1 | 0:00-0:32, 0:35-0:50 | 0:47 |
| 2 | 0:00-4:45 | 4:45 |
| 3 | 0:00-0:10 | 0:10 |
| ... | ... | ... |

FIG. 8B

Generation log table

| Identification information (61) | Processed information (62) | Generation range (64) |
|---|---|---|
| 1 | 1 | 0:00-0:32 |
| 2 | 2 | 0:00-0:45 |
| ... | ... | ... |

FIG. 10A

Playback amount table

| Identification information | Playback count | | | ... |
| --- | --- | --- | --- | --- |
| | 0:00-1:00 | 1:00-2:00 | 2:00-3:00 | ... |
| 1 | 999 | 451 | 320 | ... |
| 2 | 2200 | 2200 | 1800 | ... |
| 3 | 499 | 0 | 0 | ... |
| ... | ... | ... | ... | ... |

Generation log table

| Identification information | Processed information | | | ... |
| --- | --- | --- | --- | --- |
| | 0:00-1:00 | 1:00-2:00 | 2:00-3:00 | ... |
| 1 | 1 | 0 | 0 | ... |
| 2 | 2 | 2 | 2 | ... |
| ... | ... | ... | ... | ... |

61, 66, 65

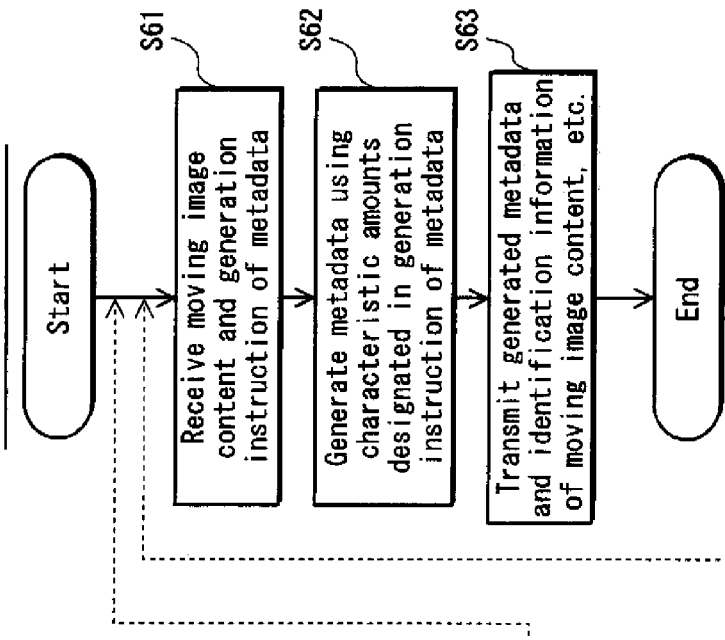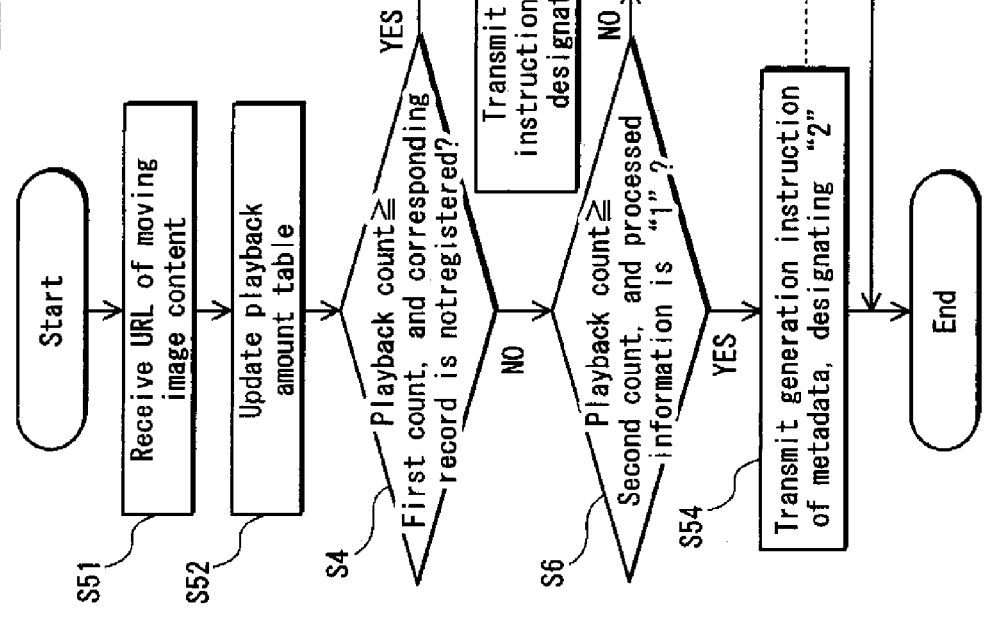
FIG. 13

METADATA GENERATION MANAGEMENT DEVICE, METADATA GENERATION SYSTEM, INTEGRATED CIRCUIT FOR MANAGING GENERATION OF METADATA, METADATA GENERATION MANAGEMENT METHOD, AND PROGRAM

BACKGROUND OF INVENTION

1. Technical Field

The present invention relates to a technique for managing generation of metadata that indicates characteristics of content.

2. Background Art

There is a well-known distribution system that, in response to a request from a terminal device for registering and playing back content, registers or distributes content (e.g., moving images) to the terminal device.

This distribution system manages registered content and metadata thereof in association with each other. By specifying specific metadata with a terminal device, a user of the distribution system can search for contents associated with the specific metadata and select content to be played back.

Patent Literature 1 discloses a well-known technique for automatically generating such metadata of content. According to Patent Literature 1, when video data is to be registered, the video data is analyzed and a signal feature of the video data is extracted. Then, based on the signal feature, operations such as automatically extracting the structure of video scenes and the feature quantity of the signal level of each scene are performed so as to generate metadata.

Also, a technique for extracting characters from video data is conventionally well known (e.g., Patent Literature 2).

CITATION LIST

[Patent Literature]
[Patent Literature 1]
  Japanese Patent Application Publication No. 2003-304473
[Patent Literature 2]
  Japanese Patent Application Publication No. 2001-111910

SUMMARY OF INVENTION

However, in the method of Patent Literature 1, metadata is uniformly generated when video data is to be registered. Therefore, as an average frequency with which a request for registering video data occurs gets higher, a distribution system having existing equipment becomes incapable of handling the registration requests. In other words, as an average frequency with which a request for registering video content occurs gets higher, it is necessary to improve the equipment of a device that generates metadata so as to reduce the processing load of the device. For example, it is possible to increase the number of devices or to upgrade the performance of the device (processor).

The present invention has been achieved in view of the above problem, and an aim thereof is to provide a metadata generation management device capable of suppressing an increase in the processing load for generating metadata even when an average frequency with which a request for registering content occurs gets higher.

In order to solve the above problem, the present invention provides a metadata generation management device comprising: a count unit operable to measure a playback amount of content, which is an amount of content that has been played back; and a control unit operable to control whether to output an instruction for generating metadata indicating characteristics of the content, based on the playback amount of the content.

According to the present invention having the stated structure, the metadata generation management device controls whether to output an instruction for generating metadata, based on a playback amount of content, and does not output the instruction with respect to content whose playback amount is small. In this way, even when an average frequency with which a request for registering content occurs gets higher, an increase in the processing load for generating metadata is suppressed.

Here, the metadata generation management device may further comprise: a generation unit, wherein the instruction may include processing amount information indicating an amount of processing required for generating the metadata of the content, the amount of processing increasing in proportion to the playback amount of the content, and the generation unit may be operable to perform generation processing for generating the metadata corresponding to the amount of processing indicated by the processing amount information.

With the stated structure, the metadata generation management device according to the present invention performs processing for generating metadata, where the amount of processing for generating metadata increases in proportion to the playback amount of content. Therefore, the larger the playback amount of content is, the more pieces of metadata can be generated for the content. As a result, in the case of using metadata for a search of content to be played back, content having a larger playback amount is more likely to appear in a search result.

Also, the playback amount of the content may be a number of times a playback request has been made for the content, and the control unit may output the instruction only when the number of times the playback request has been made is greater than or equal to a predetermined value.

With the stated structure, the metadata generation management device according to the present invention outputs an instruction for generating metadata for content only when the number of times a playback request has been made for the content is greater than or equal to a predetermined value. Therefore, metadata is generated efficiently by allocating a limited resource for metadata generation processing to content for which a playback request is more frequently made (i.e., frequently used content).

Also, the generation unit may perform the generation processing of the metadata with use of one or more criteria for extracting specific characteristics from the content, and a number of criteria used for the generation processing may correspond to the amount of processing indicated by the processing amount information.

With the stated structure, the metadata generation management device according to the present invention generates metadata with use of criteria for extracting specific characteristics, where the number of criteria used for the generation corresponds to the number of times a playback request has been made. Therefore, the more playback requests are made for content, the more pieces of metadata can be generated for the content. As a result, in the case of using metadata for a search of content to be played back, content having a larger playback amount is more likely to appear in the search result.

Also, the content may be a stream having a playback time axis, and the generation unit may perform the generation processing of the metadata based on a part of the content having a time length corresponding to the amount of processing indicated by the processing amount information.

With the stated structure, the metadata generation management device according to the present invention generates metadata based on a part of content having a time length corresponding to the number of times a playback request has been made. Therefore, the more playback requests are made for content, the more pieces of metadata can be generated for the content. As a result, in the case of using metadata for a search of content to be played back, content having a larger playback amount is more likely to appear in the search result.

Also, the content may include video data and audio data, and the generation unit may determine whether to use either or both of the video data and the audio data for the generation of the metadata, based on the amount of processing indicated by the processing amount information, and perform the generation processing of the metadata based on data determined to be used.

With the stated structure, the metadata generation management device according to the present invention generates metadata with use of either or both of video data and audio data, based on the number of times a playback request has been made. Therefore, the more playback requests are made for content, the more pieces of metadata can be generated for the content. As a result, in the case of using metadata for a search of content to be played back, content having a larger playback amount is more likely to appear in the search result.

Also, the playback amount of the content may be a time length of a part of the content that has been played back, and the control unit may output the instruction only when the time length is greater than or equal to a predetermined value.

With the stated structure, the metadata generation management device according to the present invention outputs an instruction for generating metadata for content only when part of the content that has been played back has a time length greater than or equal to a predetermined value. Therefore, metadata is generated efficiently by allocating a limited resource for metadata generation processing to content whose played-back part has a relatively long time length (i.e., frequently used content).

Here, the metadata generation management device may further comprise a generation unit, wherein the instruction may include part information indicating the part of the content that has been played back, and the generation unit may be operable to perform generation processing for generating the metadata, based on the part indicated by the part information.

With the stated structure, the metadata generation management device according to the present invention generates metadata based on a part of content that has been played back. Therefore, compared to the case of generating metadata even for a part of content that has not been played back, an increase in the processing load for generating metadata is suppressed.

Also, the playback amount of the content may be a number of times each of a plurality of parts constituting the content has been played back, based on a playback request for the content, and the control unit may output the instruction only when any of the parts of the content has been played back greater than or equal to a predetermined number of times.

With the stated structure, the metadata generation management device according to the present invention generates metadata based on content that includes a part that has been played back greater than or equal to a predetermined number of times, from among a plurality of parts constituting the content. Therefore, metadata is generated efficiently by allocating a limited resource for metadata generation processing to frequently used content.

Also, the metadata generation management device may further comprise a generation unit, wherein the instruction may include part information indicating the part of the content that has been played back greater than or equal to the predetermined number of times, and the generation unit may be operable to perform generation processing for generating the metadata, based on the part indicated by the part information.

With the stated structure, the metadata generation management device according to the present invention generates metadata based on a part of content that has been played back greater than or equal to a predetermined number of times, from among a plurality of parts constituting the content. Therefore, metadata is generated efficiently by allocating a limited resource for metadata generation processing to frequently used content.

Also, the present invention provides a metadata generation system including a distribution device for distributing content in response to a playback request, a terminal device for making the playback request to the distribution device and playing back the content distributed from the distribution device, and a metadata generation management device, wherein the metadata generation management device comprises: a count unit operable to measure a playback amount of the content, by acquiring information indicating that the distribution device has received the playback request; and a control unit operable to control whether to output an instruction for generating metadata indicating characteristics of the content, based on the playback amount of the content.

With the stated structure, the metadata generation management device in the metadata generation system according to the present invention controls whether to output an instruction for generating metadata, based on a playback amount of content, and does not output the instruction with respect to content whose playback amount is small. In this way, even when an average frequency with which a request for registering content occurs gets higher, an increase in the processing load for generating metadata is suppressed.

Also, the instruction may include processing amount information indicating an amount of processing that is required for generating the metadata of the content, and that increases in proportion to the playback amount of the content. The instruction may be output by the control unit of the metadata generation management device to the terminal device when the terminal device has made the playback request to the distribution device. The terminal device may include a generation unit operable to perform generation processing for generating the metadata corresponding to the amount of processing indicated by the processing amount information, based on the content that has been distributed in response to the playback request made to the distribution device.

With the stated structure, the metadata generation system according to the present invention causes the terminal device that has made a playback request to generate metadata of content pertaining to the playback request. This realizes generation of metadata without greatly increasing the processing loads of the metadata generation management device and the distribution device, even when an average frequency with which a request for registering content occurs gets higher.

BRIEF DESCRIPTION OF DRAWINGS

FIG. 2A shows a data structure and content example of a content table 10; FIG. 2B shows a data structure and content example of a metadata table 20; FIG. 2C shows a data structure and content example of a thumbnail image table 30; and FIG. 2D shows a data structure and content example of a distribution log table 40.

FIG. 3A shows a data structure and content example of a playback amount table 50; and FIG. 3B shows a data structure and content example of a generation log table 60.

FIG. 8A shows a data structure and content example of a playback amount table 53; and FIG. 8B shows a data structure and content example of a generation log table 63.

FIG. 10A shows a data structure and content example of a playback amount table 56; and FIG. 10B shows a data structure and content example of a generation log table 65.

FIG. 13 is a flowchart showing processing for judging whether to generate metadata, which is performed by a metadata generation management device 220, and processing for generating metadata performed by a terminal device 310A, according to Embodiment 3.

DESCRIPTION OF INVENTION

The following describes one embodiment of a metadata generation system including a metadata generation management device according to the present invention, with reference to the drawings.

Embodiment 1

Structure

Figure 1:
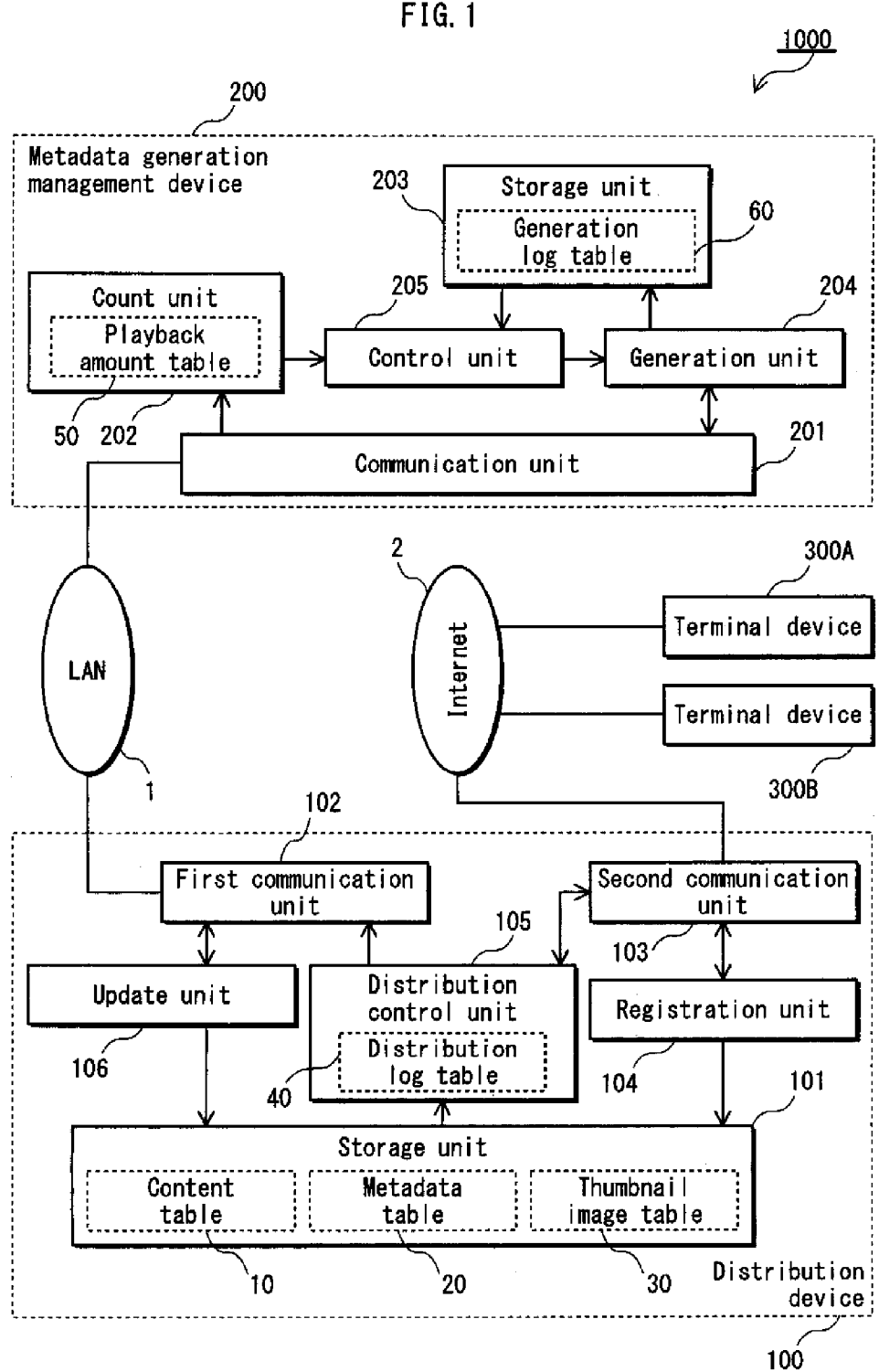
FIG. 1 shows a structure of a metadata generation system 1000 according to Embodiment 1.

First, a description is provided of a structure of a metadata generation system 1000 according to Embodiment 1.
<Metadata Generation System>
FIG. 1 shows a structure of a metadata generation system 1000 according to Embodiment 1.

The metadata generation system 1000 is a system for generating metadata that is used for a search of moving image content, according to the playback amount of the moving image content.

Note that the present embodiment is described with use of the number of times a request for playing back moving image content has been made by each terminal device (hereinafter, simply "playback count"), as one example of the playback amount of moving image content.

The metadata generation system 1000 includes a distribution device 100, a metadata generation management device 200, and terminal devices 300A and 300B. Here, although two terminal devices (300A, 300B) are shown as one example, any number of terminal devices is acceptable as long as the number is one or more. For example, the number of terminal devices may be 100 or 1000.

The distribution device 100 is connected to the metadata generation management device 200 via a LAN (Local Area Network) 1. The distribution device 100 is also connected to the terminal devices 300A and 300B via Internet 2.

Here, the distribution device 100 manages moving image content and the metadata thereof in association with each other, and functions as a Web server.

The distribution device 100 receives, from either of the terminal devices via the Internet 2, a request for searching for moving image content, which includes the designation of specific metadata. Then, the distribution device 100 transmits, as a search result, a list of moving image contents corresponding to the specific metadata, to the terminal device. Also, the distribution device 100 receives, from either of the terminal devices, a request for playing back moving image content, which includes the designation of one moving image content on the list of the moving image contents corresponding to the specific metadata. Then, the distribution device 100 distributes the moving image content that has been designated to the terminal device that has made the playback request.

Also, the distribution device 100 receives a request for registering moving image content from either of the terminal devices, and registers new moving image content corresponding to the registration request and initial metadata of the moving image content, in association with each other.

As one example, the initial metadata is assumed to be data indicating the title, playback time length, file format, and registration date and time of corresponding moving image content.

The metadata generation management device 200 manages generation of metadata. The management is performed in a manner that the larger the playback amount (i.e., playback count in the present embodiment) of moving image content stored in the distribution device 100 is, the more criteria are used to generate metadata for the moving image content, from among criteria used to extract specific characteristics from the moving image content.

In the present embodiment, the criteria used to extract specific characteristics are assumed to be amounts of characteristics of the faces of people, plants, cars, and buildings.

Each of the terminal devices (300A and 300B) is a personal computer, etc. (having a display) on which a Web browser performs operations. Each terminal device transmits a request for searching for or playing back moving image content to the distribution device 100 via the Internet 2, based on the operations of the user of the metadata generation system 1000, and receives a search result or moving image content from the distribution device 100 in response to the request.

Also, each terminal device transmits a request for registering moving image content to the distribution device 100 via the Internet 2, based on the operations of the user of the metadata generation system 1000.

The following describes further details of the structures of the distribution device 100 and the metadata generation management device 200, with reference to FIG. 1.
<Distribution Device>
First, a description is provided of the structure of the distribution device 100.

As shown in FIG. 1, the distribution device 100 includes a storage unit 101, a first communication unit 102, a second communication unit 103, a registration unit 104, a distribution control unit 105, and an update unit 106. The distribution device 100 includes a memory and a processor (not shown). The functions of the registration unit 104, the distribution control unit 105, and the update unit 106 are realized by the processor executing a program on the memory.

Here, the storage unit 101 is a memory area for storing therein a content table 10, a metadata table 20, and a thumbnail image table 30. The following only briefly describes each of the tables, since the data structure, etc. of each table is described later in detail.

The content table 10 shows, for each moving image content, identification information for identifying the moving image content and content data of the moving image content, in association with each other. The content data is composed of video data and audio data.

The metadata table 20 shows, for each moving image content, identification information for identifying the moving image content and metadata of the moving image content, in association with each other.

The thumbnail image table 30 shows, for each moving image content, identification information for identifying the moving image content and image data of the moving image content, in association with each other. The image data is of an image (hereinafter, "thumbnail image") generated based on one of the frame images that constitute moving image content.

The first communication unit 102 transmits and receives data to and from the metadata generation management apparatus 200 via the LAN 1. The second communication unit 103 transmits and receives data to and from the terminal devices (300A and 300B) via the Internet 2.

The registration unit 104 registers data into the tables stored in the storage unit 101, based on a request for registering moving image content received from either of the terminal devices via the second communication unit 103. A method for registering data to each table is described below.

The distribution control unit 105 receives a request for searching for moving image content from either of the terminal devices via the second communication unit 103, generates a search result, and transmits the search result to the terminal device. A method for generating a search result is described below.

Also, the distribution control unit 105 receives a request for playing back moving image content from either of the terminal devices via the second communication unit 103, acquires moving image content pertaining to the playback request from the content table 10, transmits the moving image content to the terminal device, and resisters history data showing the history of the transmission into the distribution log table 40.

Also, the distribution control unit 105 transmits history data that is newly registered in the distribution log table 40, to the metadata generation management device 200 via the first communication unit 102, based on a schedule set in advance by the administrator, etc. of the metadata generation system 1000.

The update unit 106 receives a request (described below) for acquiring moving image content, which includes identification information of the moving image content, from the metadata generation management device 200, and acquires the moving image content indicated by the identification information from the content table 10 of the storage unit 101. Then, the update unit 106 transmits the moving image content to the metadata generation management device 200 via the first communication unit 102. Also, the update unit 106 receives metadata generated by the metadata generation management device 200 via the first communication unit 102, and additionally registers the generated metadata into the metadata table 20.

<Metadata Generation Management device>

The following describes the structure of the metadata generation management device 200.

As shown in FIG. 1, the metadata generation management device 200 includes a communication unit 201, a count unit 202, a storage unit 203, a generation unit 204, and a control unit 205. The metadata generation management device 200 includes a memory and a processor (not shown). The functions of the count unit 202, the generation unit 204, and the control unit 205 are realized by the processor executing a program on the memory.

The communication unit 201 transmits and receives data to and from the distribution device 100 via the LAN 1.

The count unit 202 holds therein a playback amount table 50. The count unit 202 updates the playback amount table 50, based on history data received from the distribution device 100 via the communication unit 201.

Here, the playback amount table 50 shows, for each moving image content, identification information for identifying the moving image content and the playback count of the moving image content, in association with each other.

Upon updating the playback amount table 50, the count unit 202 transmits the updated playback count of the moving image content and the identification information thereof to the control unit 205.

The storage unit 203 is a memory area for storing therein a generation log table 60.

The generation log table 60 shows, for each moving image content, identification information for identifying the moving image content and processed information of the moving image content, in association with each other. Here, the processed information indicates an amount of processing actually performed to generate metadata of moving image content.

Note that the present embodiment is described based on the following assumptions. When the processed information is "1", it indicates that characteristic amounts of the faces of people and plants have been used to generate metadata of moving image content, from among the aforementioned criteria. When the processed information is "2", it indicates that all of the aforementioned criteria have been used to generate metadata of moving image content.

The control unit 205 judges whether to generate metadata of moving image content, based on the playback count of the moving image content received from the count unit 202 and the processed information of the moving image content shown by the generation log table 60. When judging that the metadata is to be generated, the control unit 205 transmits a generation instruction for generating metadata to the generation unit 204. Here, the generation instruction includes the designation of an amount of processing to be performed for the generation and the identification information of the moving image content based on which the metadata is to be generated.

In the present embodiment, the designation of an amount of processing to be performed for the generation of metadata is achieved by designating criteria to be used from among the aforementioned criteria. In the following description, it is assumed that the designation of "1" indicates that the characteristic amounts of the faces of people and plants have been designated, and that the designation of "2" indicates that the characteristic amounts of cars and buildings have been designated.

The generation unit 204 generates metadata of the moving image content designated by the generation instruction received from the control unit 205, with use of the characteristic amounts designated by the generation instruction from among the aforementioned criteria. Also, the generation unit 204 updates the processed information of the moving image content in the generation log table 60.

The moving image content based on which metadata is generated is acquired from the distribution device 100 via the communication unit 201, by the metadata generation management device 200 transmitting a request for acquiring moving image content, which includes the identification information of the moving image content, to the distribution device 100.

The generation unit 204 transmits the generated metadata and the identification information of the moving image content based on which the metadata has been generated, to the distribution device 100 via the communication unit 201. This being so, the metadata is registered into the metadata table 20 via the update unit 106 of the distribution device 100.

<Data>

The following describes data used in the metadata generation system 1000.

First, a description is provided of data used in the distribution device 100.

<Content Table>

FIG. 2A shows a data structure and content example of the content table 10.

The content table 10 shows, for each moving image content, identification information 11 and content data 12 in association with each other.

Here, each piece of the identification information 11 is information for uniquely identifying corresponding moving image content, and differs from any other pieces of the identification information 11. Each piece of content data 12 is data of corresponding moving image content.

FIG. 2A shows, for example, that the data of moving image content corresponding to the identification information "1" is "content data A".

<Metadata Table>

FIG. 2B shows a data structure and content example of the metadata table 20.

The metadata table 20 shows, for each moving image content, identification information 21 and metadata 22 in association with each other.

Each piece of the identification information 21 is information for identifying corresponding moving image content, and is identical with a piece of identification information in the content table 10 and a piece of identification information in the thumbnail image table 30. Each piece of the metadata 22 is in a text format, and includes initial metadata of corresponding moving image content. Also, the metadata 22 include metadata generated by metadata generation processing described below (see FIG. 4). In FIG. 2B, "-" denotes that there exists no metadata generated by the metadata generation processing.

For example, FIG. 2B shows metadata of moving image content whose identification information is "2". The metadata includes initial metadata and metadata generated by the metadata generation processing. The initial metadata includes: a title "Overseas Trip This Year!"; a playback time length "4:45"; a file format "avi"; and a registration date and time "2009/1/1 0:40", and metadata generated by the metadata generation processing includes "plants", "cars" and "buildings".

<Thumbnail Image Table>

FIG. 2C shows a data structure and content example of the thumbnail image table 30.

The thumbnail image table 30 shows, for each moving image content, identification information 31 and thumbnail image data 32 in association with each other.

Each piece of the identification information 31 identifies corresponding moving image content, and is identical with a piece of identification information in the content table 10 and a piece of identification information in the metadata table 20. Each piece of thumbnail image data 32 is data of a thumbnail image of corresponding moving image content.

FIG. 2C shows, for example, that the thumbnail image data of moving image content corresponding to the identification information "1" is "thumbnail image data A".

Note that each set of data pieces that are included in the respective tables and that are associated with each other is referred to as a "record". In the content table 10, for example, a set of data pieces, the identification information "1" and the "content data A", is one record.

Upon receiving a request for registering moving image content from each of the terminal devices, the registration unit 104 registers new records into the content table 10, the metadata table 20, and the thumbnail image table 30. Upon receiving a request for searching for moving image content from each of the terminal devices, the distribution control unit 105 refers to the metadata table 20 and the thumbnail image table 30 so as to generate a search result (i.e., a list of moving image contents). Upon receiving a request for playing back moving image content from each of the terminal devices, the distribution control unit 105 refers to the content table 10 so as to acquire moving image content pertaining to the playback request.

<Distribution Log Table>

FIG. 2D shows a data structure and content example of the distribution log table 40.

The distribution log table 40 shows, for each request for playing back moving image content, a date and time 41, an IP address 42, a URL 43, and a range 44 in association with each other.

Each date and time 41 shows the date and time at which a corresponding playback request was made. Each IP address 42 shows the IP address of a terminal device (300A or 300B) that made a corresponding playback request. Each URL 43 shows the URL (Uniform Resource Locator) of moving image content included in a corresponding playback request. In this example, each URL 43 partially includes the identification information of moving image content requested by a corresponding playback request, following "http://a○.b× .com/".

Each range 44 indicates a portion of moving image content transmitted in response to a corresponding playback request, among the moving image contents identified by the aforementioned pieces of identification information.

In FIG. 2D, the IP address of a terminal device that transmitted a playback request in the time and date of "2009/1/1 0:32" (i.e., at 0:32, on Jan. 1, 2009) is "xxx. xxx. xxx. 10". The URL of moving image content included in the playback request is "http://a○.b×.com/1 . . . /" (the identification information of the moving image content is "1"). The range of transmitted moving image content is "0:00-3:25". In other words, in the example of the metadata table 20, the playback time length of the moving image content corresponding to the identification information "1" is "5:30". Therefore, a portion "0:00-3:25", out of the moving image content having the playback time range of "0:00-5:30", is transmitted in response to the playback request.

The following describes data used in the metadata generation management device 200.

<Playback Amount Table>

FIG. 3A shows a data structure and content example of the playback amount table 50.

The playback amount table 50 shows, for each moving image content, identification information 51 and a playback count 52 in association with each other.

Each piece of the identification information 51 is associated with corresponding moving image content, and is identical with a piece of identification information of moving image content included in one of the URLs shown in the distribution log table 40. Each playback count 52 is the number of times a playback request has been made for corresponding moving image content.

For example, in FIG. 3A, the playback count of moving image content corresponding to the identification information "1" is "999".

<Generation Log Table>

FIG. 3B shows a data structure and content example of the generation log table 60.

The generation log table 60 shows, for each moving image content, identification information 61 and processed information 62 in association with each other.

Each piece of the identification information 61 is associated with corresponding moving image content, and is identical with a piece of identification information shown in the playback amount table 50.

Each piece of the processed information 62 indicates an amount of processing actually performed to generate metadata of corresponding moving image content. When the processed information is "1", it indicates that the characteristic amounts of the faces of people and plants have been used to generate metadata of corresponding moving image content, from among the aforementioned criteria. When the processed information is "2", it indicates that all of the aforementioned criteria have been used to generate metadata of the moving image content.

For example, in FIG. 3B, the processed information of moving image content corresponding to the identification information "1" is "1", which indicates that metadata of this moving image content was generated with use of the characteristic amounts of the faces of people and plants.

<Registration, Search, and Playback of Moving Image Content>

The following briefly describes the flow of registration processing, search processing, and playback processing of moving image content.

<Registration>

First, a description is provided of how moving image content is registered in the distribution device 100.

Upon receiving an access request from either of the terminal devices 300A and 300B (hereinafter, also referred to as "registration terminal") via the second communication unit 103, the registration unit 104 of the distribution device 100 transmits HTML (Hyper Text Markup Language) data constituting the registration screen to the registration terminal via the second communication unit 103. Here, the access request is a request for accessing a webpage (hereinafter, "registration screen") for registration of moving image content, and includes designation of the URL of the webpage.

Upon receiving the registration screen, the registration terminal displays the registration screen as the webpage on a display thereof. When the user of the registration terminal designates moving image content to be registered and the title thereof on the registration screen, the registration terminal transmits a request for registering the designated moving image content to the distribution device 100. Note that the request for registering the moving image content is assumed to include the designation of the title of the moving image content.

Upon receiving the request for registering the moving image content from the registration terminal via the second communication device 103, the registration unit 104 of the distribution device 100 generates identification information, a thumbnail image, and initial metadata of the moving image content.

Here, the identification information of the moving image content is, for example, a value obtained by adding one to the identification information of moving image content that was most recently registered. In other words, pieces of identification information of moving image contents are generated to be sequentially numbered from one. Also, the thumbnail image of the moving image content is assumed to be, for example, an image obtained by either enlarging or reducing an initial one of frame images that constitute the moving image content to a predetermined size.

As described above, initial metadata includes a title, playback time length, a file format, and registration date and time of moving image content. In order to generate initial metadata of moving image content pertaining to a registration request, the registration unit 104 sets a title designated by the user as the title of the moving image content, acquires the playback time length and file format of the moving image content by analyzing the moving image content, and sets the current date and time to the registration date and time.

The registration unit 104 registers generated identification information of moving image content and content data of moving image content pertaining to a registration request into the content table 10 of the storage unit 101, by associating the identification information with the content data. Also, the registration unit 104 registers the identification information and initial metadata generated for the moving image content into the metadata table 20, by associating the identification information with the initial metadata. Furthermore, the registration unit 104 registers the identification information and thumbnail image data generated for the moving image content into the thumbnail image table 30, by associating the identification information with the thumbnail image data.

By the processing described above, moving image content desired by the user of the registration terminal is newly registered into the distribution device 100. Then, according to a request for searching for the moving image content from a terminal device (300A or 300B), the moving image content is targeted for a search. Also, according to a request for playing back the moving image content from a terminal device (300A or 300B), the moving image content is placed in a state of being distributed to the terminal device that has made the playback request.

<Search>

The following describes how a search is conducted for moving image content registered by the processing described above.

Upon receiving an access request from either of the terminal devices 300A and 300B (hereinafter, also referred to as "viewing terminal") via the second communication unit 103, the distribution control unit 105 of the distribution device 100 transmits HTML data constituting the search screen to the viewing terminal via the second communication unit 103. Here, the access request is a request for accessing a webpage (hereinafter, "search screen") for a search of moving image content, and includes designation of the URL of the webpage.

Upon receiving the search screen, the viewing terminal displays the search screen as the webpage on a display thereof. When the user of the viewing terminal inputs, on the search screen, specific metadata indicating characteristics of moving image content which he/she desires to search for, the viewing terminal transmits a request for searching for the moving image content to the distribution device 100. Here, the request includes the designation of the title of the moving image content.

Upon receiving the request for searching for the moving image content from the viewing terminal via the second communication device 103, the distribution control unit 105 of the distribution device 100 searches for moving image contents corresponding to the specific metadata designated by the search request, generates HTML data constituting a screen that shows a search result, and transmits the HTML data to the viewing terminal via the second communication unit 103.

Here, the screen that shows the search result shows thumbnail images of the moving image contents corresponding to the specific metadata designated by the search request and the titles of the moving image contents. The thumbnail images and the titles on the screen are arranged side-by-side, and each title is provided with a link to the URL of corresponding moving image content.

The generation of HTML data constituting a screen for a search result is performed as follows. The distribution control unit 105 acquires, from the metadata table 20 of the storage unit 101, identification information and a title of each moving image content which is associated with specific metadata designated by a search request. Also, the distribution control unit 105 acquires, from the thumbnail image table 30, thumbnail image data which is associated with the acquired identification information. Then, the distribution control unit 105 generates HTML data constituting a screen for a search result on which a thumbnail image and a title are arranged side-by-side for each moving image content.

Upon receiving the screen for a search result, the viewing terminal displays the screen as a webpage on a display thereof.

The processing described above allows the user of the viewing terminal to acquire a list of moving image contents corresponding to the specific metadata that he/she has input.

<Playback>

The following describes a method for playing back moving image content selected from the list of the moving image contents acquired by the processing described above.

The viewing terminal displays the screen for a search result to enable the user thereof to designate moving image content for playback. When the user clicks a portion on the screen where the title of moving image content is displayed, the viewing terminal transmits a playback request for playing back the moving image content, which includes the URL of the moving image content and designation of a playback position, to the distribution device 100.

Note that the URL of the moving image content includes identification information of the moving image content, and the beginning of the moving image content identified by the identification information is designated as the playback position.

Upon receiving a playback request from the viewing terminal via the second communication unit 103, the distribution control unit 105 of the distribution device 100 sequentially acquires, from the content table 10 of the storage unit 101, data pieces of moving image content that is indicated by identification information included in the playback request, and transmits the data pieces to the viewing terminal. Here, the acquisition starts from the designated playback position (top in this example) of the moving image content.

When starting to receive the data pieces of the moving image content, the viewing terminal activates a preinstalled application for playing back moving images, and plays back the moving image content.

Note that the user of the viewing terminal can perform operations, such as a pause, stop, fast-forward, rewind, designation of a playback position, etc. of the moving image content, on the preinstalled application. In order to control transmission and reception of the moving image content according to such operations, a session is maintained between the viewing terminal and the distribution device 100, and control information is exchanged therebetween, until transmission of the moving image content is completed.

Upon completing transmission of moving image content pertaining to one playback request, the distribution control unit 105 registers history data into the distribution log table 40. In other words, the distribution control unit 105 registers history data when the distribution control unit 105 has completed transmission of all data pieces of moving image content pertaining to one playback request, or when an operation for stopping playback of the moving image content was performed on the viewing terminal before the transmission of all data pieces of the moving image content is completed.

<Operations>

The following describes operations of the metadata generation management device 200.

Figure 4:
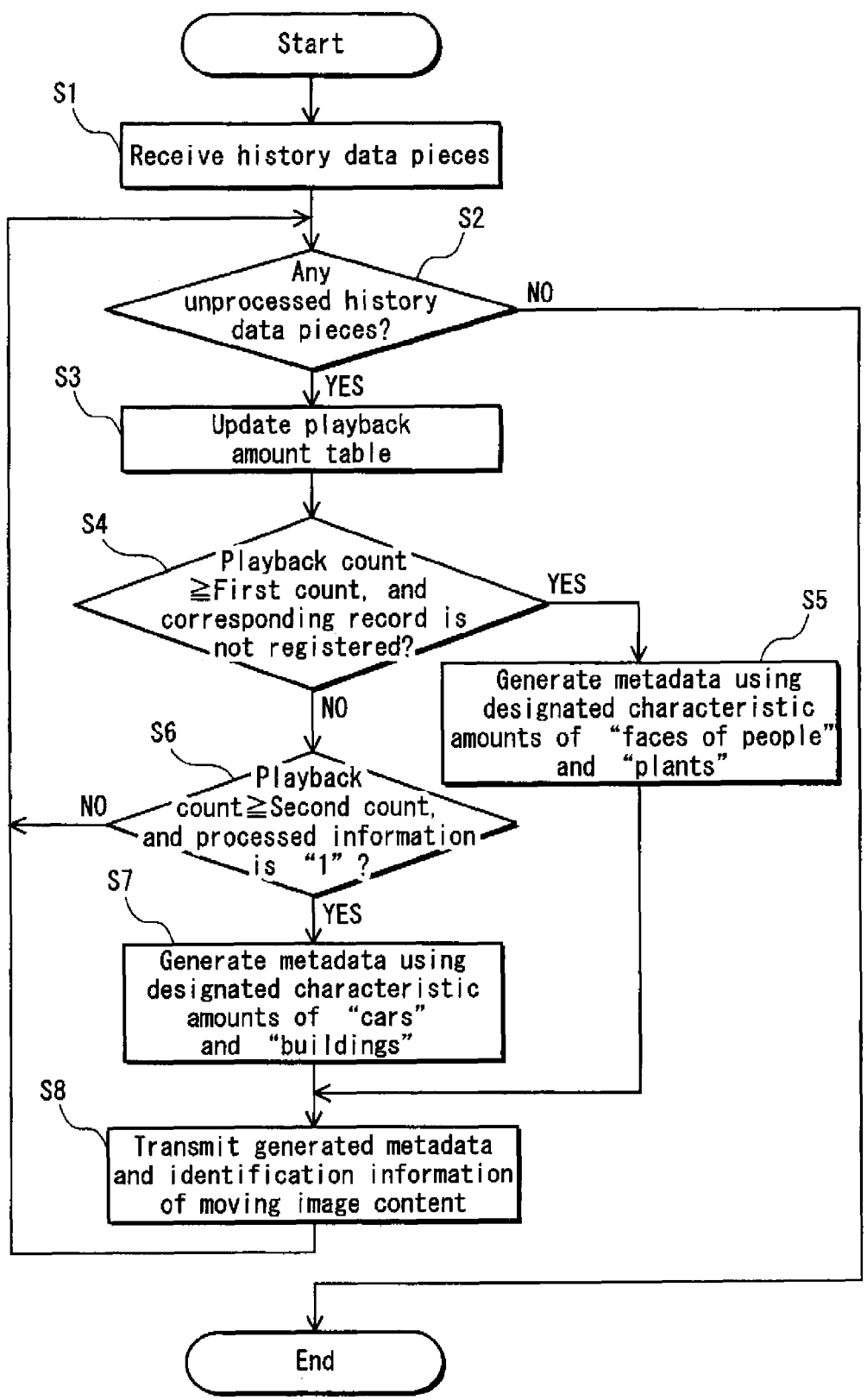
FIG. 4 is a flowchart showing processing for generating metadata, which is performed by a metadata generation management device 200.

FIG. 4 is a flowchart showing processing for generating metadata, which is performed by the metadata generation management device 200.

The distribution control unit 105 of the distribution device 100 extracts, from the distribution log table 40, history data pieces newly registered since the previous transmission of history data, based on a schedule (e.g., 1:00 a.m. everyday) set in advance by a manager of the system or the like. Then, the distribution control unit 105 transmits the extracted history data pieces to the metadata generation management device 200 via the first communication unit 102.

Upon receiving the history data pieces via the communication unit 201 of the metadata generation management device 200 (step S1), the count unit 202 judges whether there are any unprocessed history data pieces in the history data pieces (step S2). The unprocessed history data pieces are those on which processing of step S3 onwards described below has not been performed yet.

When judging that there are one or more unprocessed history data pieces (step S2: YES), the count unit 202 updates the playback amount table 50 based on one of the unprocessed history data pieces (step S3).

Specifically, the count unit 202 extracts identification information in the URL of moving image content included in the unprocessed history data piece. When a record including the identification information is registered in the playback amount table 50, the count unit 202 updates a playback count included in the record by incrementing the playback count by one. When a record including the identification information is not registered in the playback amount table 50, the count unit 202 registers, into the playback amount table 50, a new record in which the identification information is associated with "1" as a playback count.

For example, assume that identification information extracted by the count unit 202 is "3". In this case, a record in which the identification information "3" is associated with a playback count "499" is registered in the example of the playback amount table 50 in FIG. 3A. Therefore, the count unit 202 updates the playback count to "500" by incrementing the playback count by one.

Also, assume that identification information extracted by the count unit 202 is "100", and that a record including the identification information "100" is not registered in the example of the playback amount table 50 in FIG. 3A. In this case, the count unit 202 registers, into the playback amount table 50, a record in which the identification information "100" is associated with "1" as a playback count.

Upon completing the processing of step S3, the count unit 202 transmits, to the control unit 205, the extracted identification information of the moving image content and the updated playback count. Upon receiving the identification information and the playback count, the control unit 205 judges whether both of the following conditions are satisfied: the playback count is greater than or equal to a first count (hereinafter, the first count is assumed to be "500" as one example); and a record including the identification information is not registered in the generation log table 60 of the storage unit 203 (step S4).

Assume that, as described in the aforementioned example, the control unit 205 receives the identification information "3" and the playback count "500", and that a record including the identification information "3" is not registered in the example of the generation log table 60 in FIG. 3B. In this case, the control unit 205 judges that the conditions of step S4 are satisfied, since the playback count is greater than the first count and the record is not registered in the generation log table 60 (step S4: YES).

Also, assume that, as described in the aforementioned example, the control unit 205 receives the identification information "100" and the playback count "1". In this case, since the playback count "1" is less than the first count, the control unit 205 judges that the conditions of step S4 are not satisfied (step S4: NO).

When judging that the conditions of step S4 are satisfied (step S4: YES), the control unit 205 transmits a generation instruction for generating metadata to the generation unit 204. Here, the generation instruction includes the received identification information and "1" as designation of an amount of processing required for generation of the metadata.

Upon receiving the generation instruction of the metadata, the generation unit 204 transmits an acquisition request to the distribution device 100 via the communication unit 201. Here, the acquisition request is a request for acquiring moving image content, and includes the identification information included in the generation instruction. Then, the generation unit 204 receives the moving image content indicated by the identification information from the distribution device 100 via the communication unit 201.

Upon receiving the moving image content, the generation unit 204 generates metadata of the moving image content with use of the characteristic amounts of "the faces of people" and "plants" among the plurality of criteria, based on the whole video data of the moving image content (step S5). This is because the designation of an amount of processing required for generation of the metadata, which is included in the received generation instruction, is "1".

Here, the generation of metadata may be performed as follows, for example.

The generation unit 204 manages, for each characteristic such as the faces of people, plants, cars, and buildings, (i) characteristic amount data for extracting the characteristic and (ii) a character string (text data such as "the faces of people") representing the characteristic, in association with each other. The generation unit 204 performs processing for determining whether any of the frame images constituting video data matches characteristic amount data. If any of the frame images matches the characteristic amount data to a predetermined extent or more, the generation unit 204 generates metadata that is text data corresponding to the characteristic amount data.

For example, in a case where any of the frame images constituting video data matches the characteristic amount data of "the faces of people" to a predetermined extent or more, text data of "the faces of people" is generated as metadata.

Upon completing the processing of step S5, the generation unit 204 registers a record in which the identification information included in the received generation instruction is associated with "1" as the processed information, into the generation log table 60 of the storage unit 203.

When judging that the conditions of step S4 are not satisfied (step S4: NO), the control unit 205 judges whether both of the following conditions are satisfied: the playback count is greater than or equal to a second count (hereinafter, the second count is assumed to be "1000" as one example); and the processed information corresponding to the received identification information of the moving image content, which is shown in the generation log table 60 of the storage unit 203, is "1" (step S6).

For example, assume that the control unit 205 receives the identification information "1" and a playback count "1000". In this case, the playback count is equal to the second count, and a record in which the identification information "1" is associated with the processed information "1" is registered in the example of the generation log table 60 in FIG. 3B. Therefore, the control unit 205 judges that the conditions of step S6 are satisfied (step S6: YES).

Also, assume that the control unit 205 receives identification information "2" and a playback count "2201". In this case, although the playback count is greater than the second count, a record in which the identification information "2" is associated with the processed information "2" is not registered in the example of the generation log table 60 in FIG. 3B. Therefore, the control unit 205 judges that the conditions of step S6 are not satisfied (step S6: NO).

Also, assume that the control unit 205 receives identification information "100" and a playback count "1". In this case, since the playback count "1" is less than the second count, the control unit 205 judges that the conditions of step S6 are not satisfied (step S6: NO).

When the control unit 205 judges that the conditions of step S6 are not satisfied (step S6: NO), the metadata generation management device 200 repeats the processing from step S2. When judging that the conditions of step S6 are satisfied (step S6: YES), the control unit 205 transmits a generation instruction for generating metadata to the generation unit 204. Here, the generation instruction includes the received identification information and "2" as designation of an amount of processing required for generation of the metadata.

Upon receiving the generation instruction of metadata, the generation unit 204 receives, from the distribution device 100, moving image content indicated by the identification information in the generation instruction, in the same manner as the processing of step S5. Then, the generation unit 204 generates metadata of the moving image content with use of the characteristic amounts of "cars" and "buildings" among the plurality of criteria, based on the whole video data of the moving image content (step S7). Here, the characteristic amounts of "cars" and "buildings" are used for the generation because the designation of an amount of processing required for generation of the metadata, which is included in the received generation instruction, is "2".

Upon completing the processing of step S7, the generation unit 204 updates the processed information corresponding to the identification information included in the received generation instruction, which is shown in the generation log table 60 of the storage unit 203, to "2".

Upon completing generation of metadata in either step S5 or step S7, the generation unit 204 transmits, to the distribution device 100 via the communication unit 201, the generated metadata and the identification information included in the generation instruction (step S8). Then, the metadata generation management device 200 repeats the processing from step S2.

Note that the metadata and the identification information transmitted in step S8 are received by the update unit 106 of the distribution device 100 via the first communication unit 102, and the received metadata is registered into the metadata table 20 of the storage unit 101, by being added to the metadata corresponding to the received identification information in the metadata table 20.

When judging that there is no unprocessed history data piece (i.e., those on which the processing of step S3 onwards is not performed) in the history data pieces (step S2: NO), the metadata generation management device 200 ends the generation processing of metadata.

As described above, when the playback count of moving image content is less than the first count, the metadata generation management device 200 does not generate any metadata other than initial metadata for the moving image content. When the playback count of moving image content is greater than or equal to the first count, the metadata generation management device 200 generates metadata with use of the characteristic amounts of "the faces of people" and "plants". When the playback count of moving image content is greater than or equal to the second count, the metadata generation management device 200 further generates metadata with use of the characteristic amounts of "cars" and "buildings".

As a result, an amount of processing for generating metadata increases in proportion to the playback count of moving image content. This means that metadata is generated with efficient use of a limited resource provided for the generation processing of metadata.

[Modification 1]

In Embodiment 1, a description is provided of one example of generating metadata such that an amount of processing for generating metadata increases in proportion to the playback amount of moving image content. Specifically, in the example of Embodiment 1, the larger the playback count of moving image content is, the more criteria are used to generate the metadata of the moving image content. The following describes one modification of generating metadata such that the larger the playback count of moving image content is, the larger part of the moving image content is based on to generate metadata.

A metadata generation management device according to Modification 1 is different from the metadata generation management device 200 according to Embodiment 1, with respect to a generation unit whose functions are slightly changed from those of the generation unit 204 of the metadata generation management device 200. Therefore, the following mainly describes the difference.

<Operations>

The following describes operations of the metadata generation management device according to Modification 1.

Figure 5:
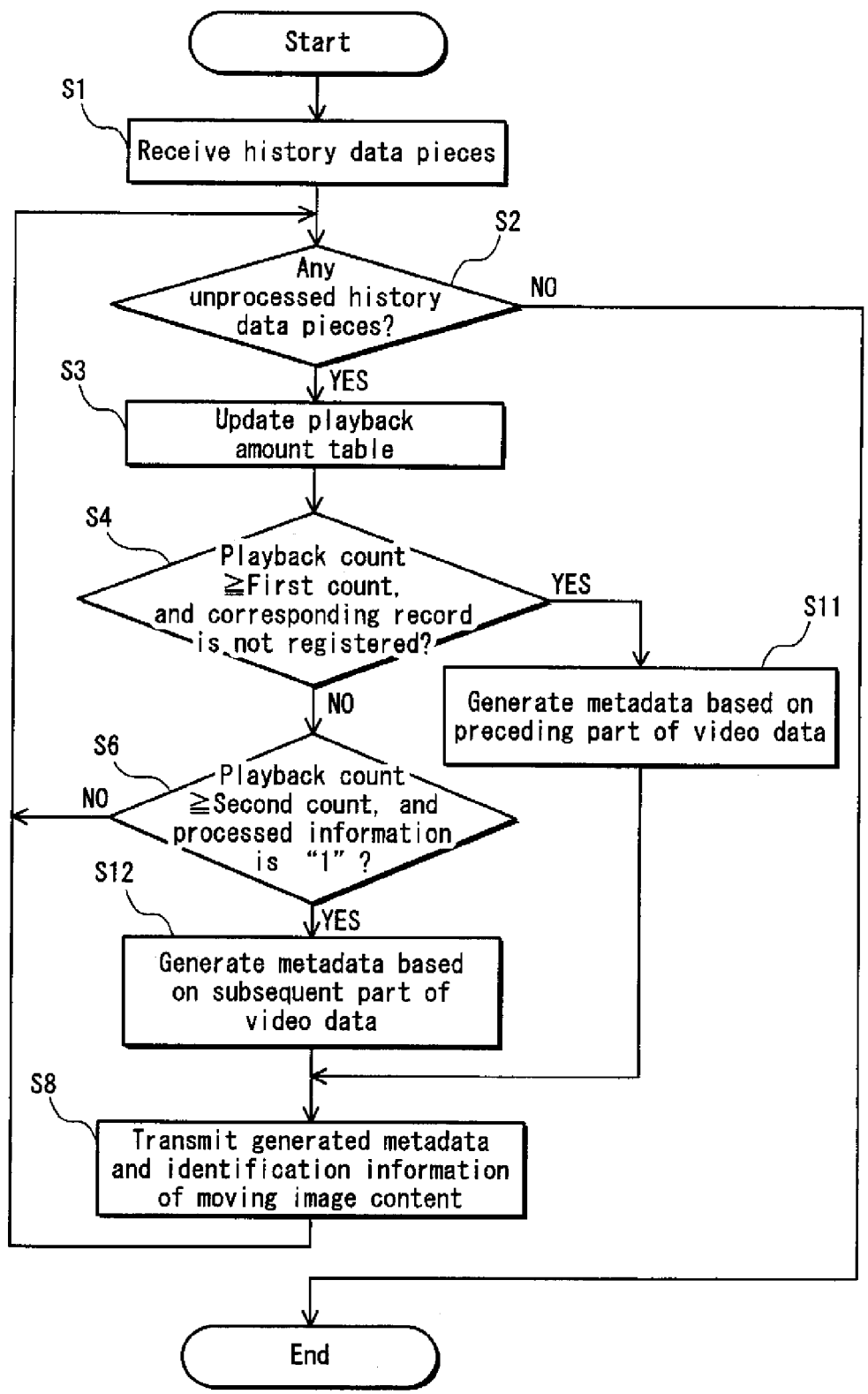
FIG. 5 is a flowchart showing processing for generating metadata, which is performed by a metadata generation management device according to Modification 1.

FIG. 5 is a flowchart showing processing for generating metadata, which is performed by the metadata generation management device according to Modification 1.

The generation processing performed by the metadata generation management device according to Modification 1 includes processing of steps S11 and S12, instead of steps S5 and S7 of the generation processing performed by the metadata generation management device 200 according to Embodiment 1.

Therefore, the following mainly describes the processing of steps S11 and S12.

The metadata generation management device according to Modification 1 performs the processing of steps S1 to S4 in the same manner as Embodiment 1. When judging that the conditions of step S4 are satisfied (step S4: YES), the control unit 205 transmits a generation instruction for generating metadata to the generation unit according to Modification 1. Here, the generation instruction includes received identification information and "1" as designation of an amount of processing required for generation of the metadata. Upon receiving the generation instruction of the metadata, the generation unit according to Modification 1 receives, from the distribution device 100 via the communication unit 201, moving image content indicated by the identification information that is included in the generation instruction. The processing described so far in Modification 1 is the same as the processing in Embodiment 1.

Upon receiving the moving image content, the generation unit according to Modification 1 generates metadata of the moving image content, based on a preceding part of the video data of the moving image content, with use of all of the plurality of criteria, i.e., characteristic amounts of "the faces of people", "plants", "cars", and "buildings" (step S11). Here, the preceding part of the video data is used for the generation because the designation of an amount of processing required for generation of the metadata, which is included in the received generation instruction, is "1". Upon completing the processing of step S11, the generation unit updates the generation log table 60, in the same manner as Embodiment 1.

Here, the preceding part of video data refers to a preceding part of video data when the video data is divided into two equal parts. For example, in a case where the length (length of playback time) of moving image content is 10 minutes, the preceding part of the moving image content is a part where the playback time is less than 5 minutes.

When judging that the conditions of step S4 are not satisfied (step S4: NO), the control unit 205 judges whether the conditions of step S6 are satisfied, in the same manner as Embodiment 1.

When the control unit 205 judges that the conditions of step S6 are not satisfied (step S6: NO), the metadata generation management device according to Modification 1 repeats the processing from step S2. When judging that the conditions of step S6 are satisfied (step S6: YES), the control unit 205 transmits a generation instruction for generating metadata to the generation unit according to Modification 1. The generation instruction includes the received identification information and "2" as designation of an amount of processing required for generation of the metadata. Upon receiving the generation instruction of the metadata, the generation unit according to Modification 1 receives, from the distribution device 100 via the communication unit 201, moving image content indicated by the identification information included in the generation instruction. This part of processing is the same as Embodiment 1.

Upon receiving the moving image content, the generation unit according to Modification 1 generates metadata of the moving image content, based on a subsequent part of the video data of the moving image content, with use of all of the plurality of criteria, i.e., characteristic amounts of "the faces of people", "plants", "cars", and "buildings" (step S12). Here, the subsequent part of the video data is used for the generation because the designation of an amount of processing required for generation of the metadata, which is included in the received generation instruction, is "2". Upon completing the processing of step S12, the generation unit updates the generation log table 60, in the same manner as Embodiment 1.

Here, the subsequent part of video data refers to a subsequent part of video data when the video data is divided into two equal parts. For example, in the aforementioned case (the case where the length of moving image content is 10 minutes), the subsequent part of the moving image content is a part where the playback time is greater than or equal to 5 minutes.

Upon completing generation of metadata in either step S11 or step S12, the generation unit according to Modification 1 performs the processing of step S8, in the same manner as Embodiment 1.

[Modification 2]

In Modification 1, a description is provided of one example of generating metadata such that an amount of processing for generating metadata increases in proportion to the playback amount of moving image content. Specifically, in Modification 1, the larger the playback count of moving image content is, the larger part of the moving image content is based on to generate metadata.

The following describes one modification in which, out of video data and audio data that constitute moving image content, metadata of the moving image content is generated based on either only video data or both video and audio data, depending on the playback count of the moving image content.

A metadata generation management device according to Modification 2 is different from the metadata generation management device according to the aforementioned Modification 1, with respect to a generation unit whose functions are slightly changed from those of the generation unit of the metadata generation management device according to Modification 1. Therefore, the following mainly describes the difference.

<Operations>

The following describes operations of the metadata generation management device according to Modification 2.

Figure 6:
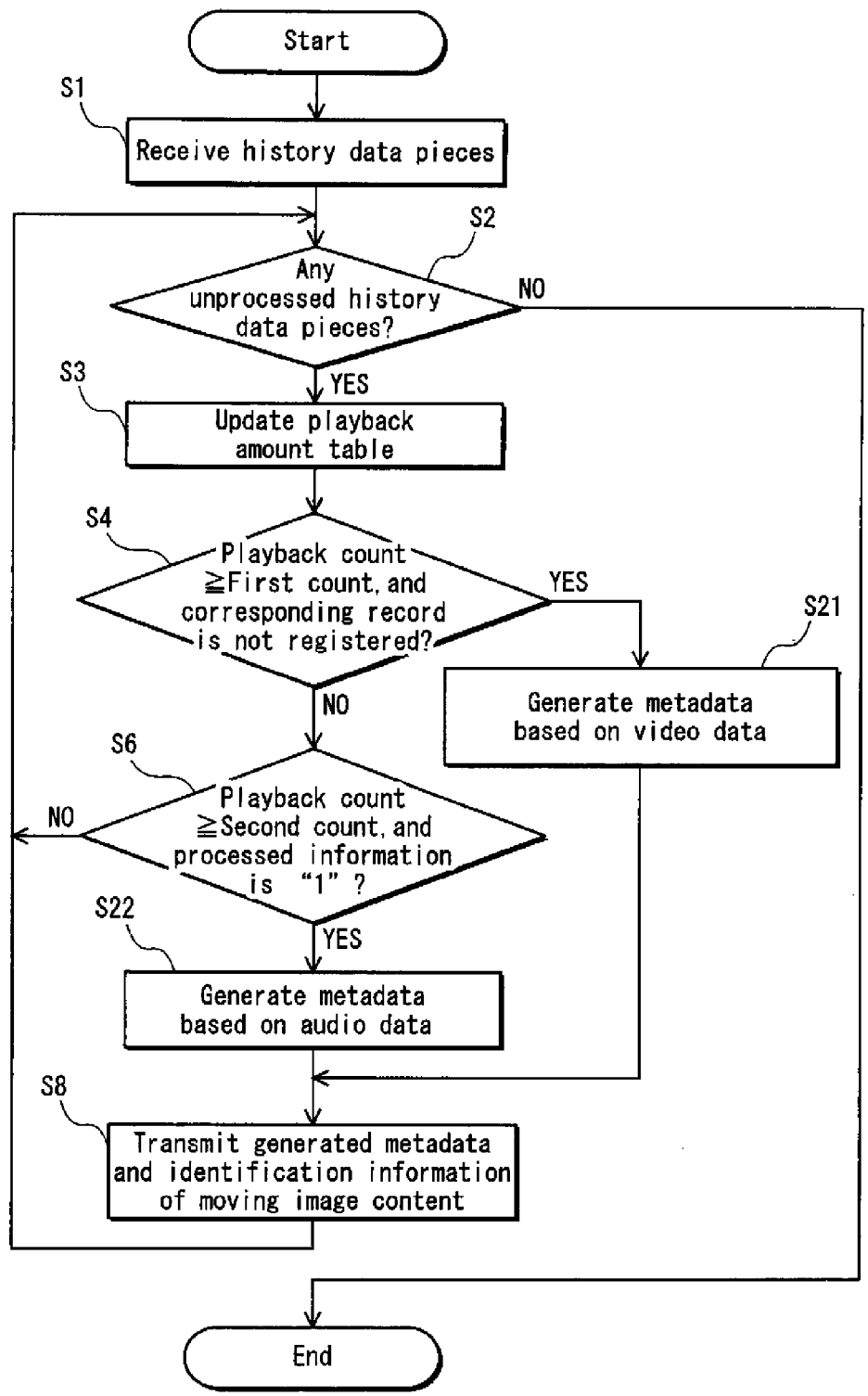
FIG. 6 is a flowchart showing processing for generating metadata, which is performed by a metadata generation management device according to Modification 2.

FIG. 6 is a flowchart showing processing for generating metadata, which is performed by the metadata generation management device according to Modification 2.

The generation processing performed by the metadata generation management device according to Modification 2 includes processing of steps S21 and S22, instead of steps S11 and S12 of the generation processing performed by the metadata generation management device according to Modification 1.

Therefore, the following describes the processing of steps S21 and S22.

In step S21, upon receiving a generation instruction for generating metadata, the generation unit according to Modification 2 generates metadata of moving image content received from the distribution device 100, based on video data of the moving image content, with use of all of the plurality of criteria, i.e., characteristic amounts of "the faces of people", "plants", "cars", and "buildings" (step S21). Here, the video data of the moving image content is used for the generation because the designation of an amount of processing required for generation of the metadata, which is included in the received generation instruction, is "1".

In step S22, upon receiving moving image content from the distribution device 100, the generation unit according to Modification 2 generates metadata of the moving image content, based on audio data of the moving image content (step S22). Here, the audio data of the moving image content is used for the generation because the designation of an amount of processing required for generation of the metadata, which is included in the received generation instruction, is "2".

Here, the generation of metadata based on audio data may be performed as follows, for example.

The generation unit according to Modification 2 manages, for each characteristic, an audio pattern used for extracting the characteristic and a character string (text data) representing the characteristic, in association with each other. The generation unit performs processing for determining whether audio data matches these audio patterns. If the audio data matches any of the audio patterns to a predetermined extent or more, the generation unit generates metadata that is text data corresponding to the audio pattern.

For example, in a case where audio data matches the audio pattern of "cars" (e.g., the audio pattern of the engine sound of a car, etc.) to a predetermined extent or more, text data of "cars" is generated as metadata.

Embodiment 2

In Embodiment 1 described above, a description is provided of an example of using the number of times a request for playing back moving image content has been made by each terminal device (i.e., "playback count"), as the playback amount of moving image content. The following describes an example of using the time length of a part of the moving image content that is actually played back, as the playback amount of moving image content.

Figure 7:
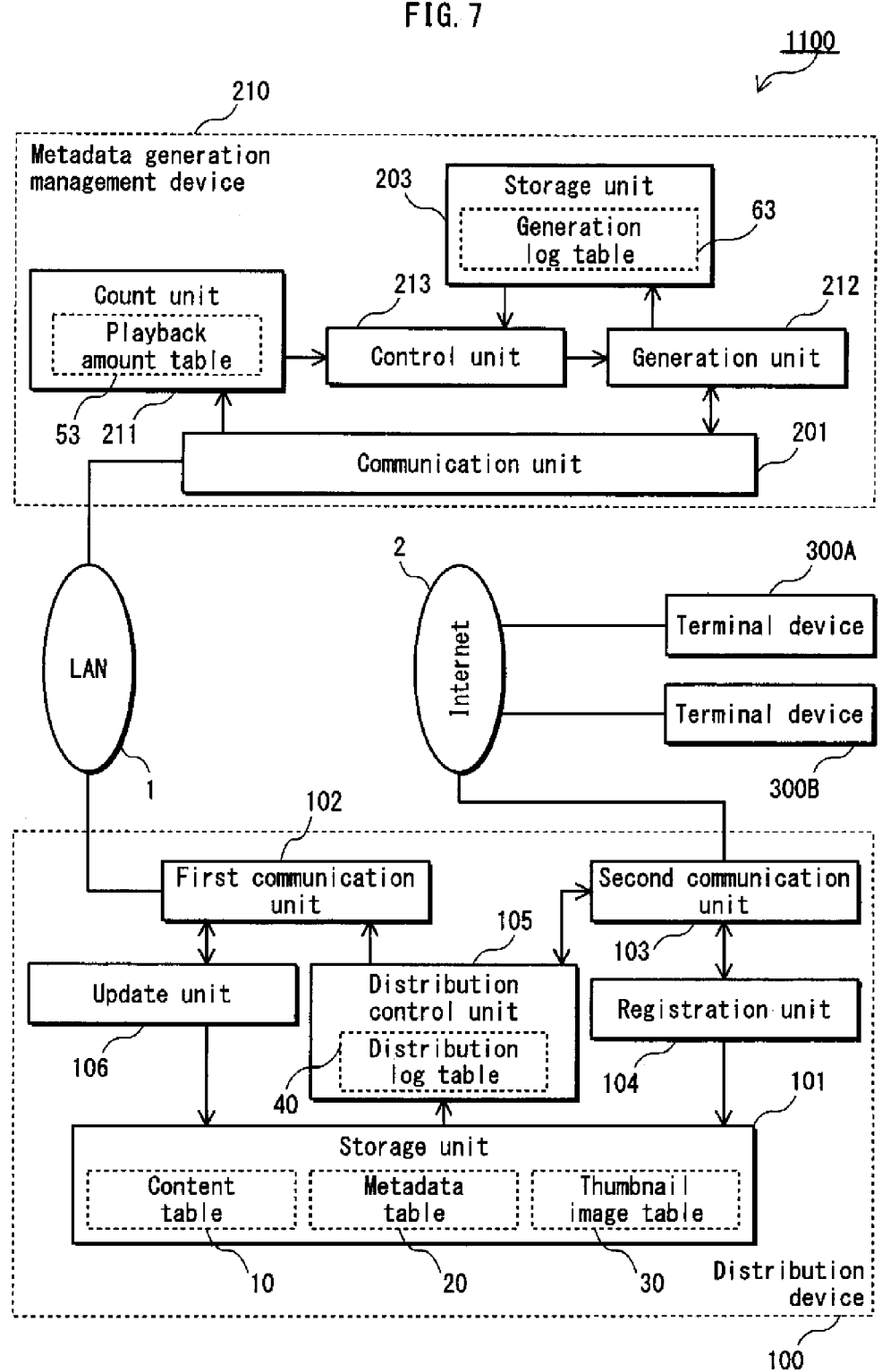
FIG. 7 shows a structure of a metadata generation system 1100 according to Embodiment 2.

FIG. 7 shows a structure of a metadata generation system 1100 according to Embodiment 2.

As shown in FIG. 7, the metadata generation system 1100 includes a metadata generation management device 210, instead of the metadata generation management device 200 in the metadata generation system 1000 according to Embodiment 1.

Also, the metadata generation management device 210 includes a count unit 211, a generation unit 212, and a control unit 213, instead of the count unit 202, the generation unit 204, and the control unit 205 included in the metadata generation management device 200 according to Embodiment 1 described above. The functions of the count unit 211, the generation unit 212, and the control unit 213 are slightly changed from those of the count unit 202, the generation unit 204, and the control unit 205. Therefore, the following mainly describes the change.

<Data>

The following describes data used in the metadata generation management device 210.

<Playback Amount Table>

FIG. 8A shows a data structure and content example of a playback amount table 53.

The playback amount table 53 shows, for each moving image content, the identification information 51, a playback range 54, and a playback time 55, in association with each other. The playback amount table 53 is different from the playback amount table 50 according to Embodiment 1, in that the playback amount table 53 includes the playback range 54 and the playback time 55 instead of the playback count 52.

Each of the playback ranges 54 is information indicating a portion of corresponding moving image content that is actually played back. Each of the playback times 55 is information indicating a total time of a corresponding playback range.

For example, FIG. 8A shows that the playback range of moving content corresponding to the identification information "1" is "0:00-0:32 and 0:35-0:50", and the playback time of the moving content is "0:47".

<Generation Log Table>

FIG. 8B shows a data structure and content example of a generation log table 63.

The generation log table 63 shows, for each moving image content, data that includes the identification information 61, the processed information 62, and a generation range 64, in association with each other. The generation log table 63 is different from the generation log table 60 according to Embodiment 1 with respect to the generation range 64.

The generation range 64 is information indicating a portion of corresponding moving image content that is based on to generate metadata.

For example, the generation log table 63 in FIG. 8B shows that the processed information of moving image content corresponding to the identification information "1" is "1", and that the generation range of the moving image content is "0:00-0:32". In other words, since the playback time length of the moving image content corresponding to the identification information "1" is "5:30" in the example of the metadata table 20 in FIG. 2B, the generation log table 53 shows that metadata is generated based on a part "0:00-0:32" out of "0:00-5:30" of the moving image content, with use of characteristic amounts of "the faces of people" and "plants".

<Operations>

The following describes operations of the metadata generation management device 210 according to Embodiment 2.

Figure 9:
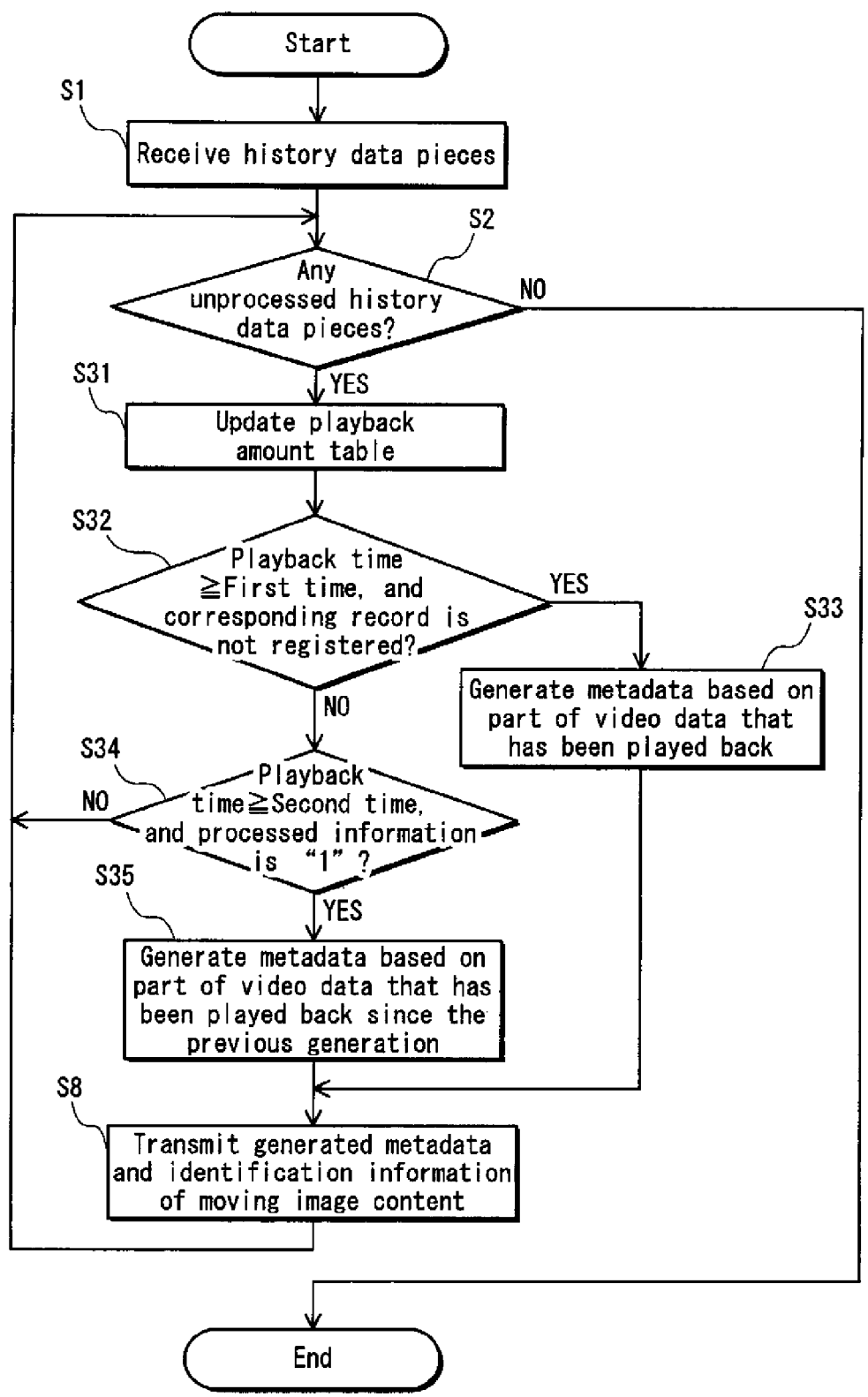
FIG. 9 is a flowchart showing processing for generating metadata, which is performed by a metadata generation management device 210 according to Embodiment 2.

FIG. 9 is a flowchart showing processing for generating metadata, which is performed by the metadata generation management device 210.

The metadata generation management device 210 performs the processing of steps S1 and S2 in the same manner as Embodiment 1 described above. When judging that there are one or more unprocessed history data pieces (step S2: YES), the count unit 211 updates the playback amount table 53 based on one of the unprocessed history data pieces (step S31).

Specifically, the count unit 211 extracts identification information in the URL of moving image content included in the unprocessed history data piece. When a record including the identification information is registered in the playback amount table 53, the count unit 211 updates the playback amount table 53 by merging the range of the transmitted moving image content included in the unprocessed history data piece into the playback range included in the record, calculating the playback time from the playback range after the merger, and updating the playback time included in the record to the calculated playback time.

When a record including the extracted identification information is not registered in the playback amount table 53, the count unit 211 calculates a playback time from the range of the transmitted moving image content included in the unprocessed history data, and registers, into the playback amount table 53, a new record in which the identification information, the range of the transmitted moving image content, and the calculated playback time are associated with each other.

For example, assume that identification information extracted by the count unit 211 is "1", and that the range of the transmitted moving image content included in the unprocessed history data is "0:00-5:30". In this case, a record, in which the identification information "1", a playback range "0:00-0:32 and 0:35-0:50", and a playback time "0:47" are associated with each other, is registered in the example of the playback amount table 53 in FIG. 8A. Therefore, the count unit 211 updates the playback range of the record to "0:00-5:30", and the playback time thereof to "5:30".

Also, assume that identification information extracted by the count unit 211 is "1", and that the range of the transmitted moving image content included in the unprocessed history data is "2:00-3:00". In this case, in the example of the playback amount table 53 in FIG. 8A, the count unit 211 updates the playback range of a record including the identification information "1" to "0:00-0:32, 0:35-0:50, and 2:00-3:00", and a playback time of the record to "1:47".

Also, assume that identification information extracted by the count unit 211 is "100", that the range of the transmitted moving image content included in the unprocessed history data is "0:00-1:00", and that a record including the identification information "100" is not registered in the example of the playback amount table 53 in FIG. 8A. In this case, the count unit 211 registers, into the playback amount table 53, a record in which the identification information "100", the playback range "0:00-1:00", and the playback time "1:00" are associated with each other.

Upon completing the processing of step S31, the count unit 211 transmits, to the control unit 213, the extracted identification information of the moving image content, the updated playback range and the updated playback time. The control unit 213 judges whether both of the following conditions are satisfied: the received playback time is greater than or equal to a first time (hereinafter, the first time is assumed to be "1:00 (one minute)" as one example); and a record including the received identification information of the moving image content is not registered in the generation log table 63 of the storage unit 203 (step S32).

Assume that, as described in the aforementioned example, the control unit 213 receives the identification information "100", and the playback time "1:00". In this case, the playback time "1:00" is equal to the first time, and a record including the identification information "100" is not registered in the example of the generation log table 63 in FIG. 8B. Therefore, the control unit 213 judges that the conditions of step S32 are satisfied (step S32: YES).

Also, assume that the control unit 213 receives identification information "4", and a playback time "0:32". In this case, since the playback time "0:32" is less than the first time, the control unit 213 judges that the conditions of step S32 are not satisfied (step S32: NO).

When judging that the conditions of step S32 are satisfied (step S32: YES), the control unit 213 transmits a generation instruction for generating metadata to the generation unit 212. Here, the generation instruction includes the identification information received from the count unit 211 and the updated playback range.

Upon receiving the generation instruction of the metadata, the generation unit 212 acquires, from the distribution device 100, moving image content indicated by the identification information included in the generation instruction, in the same manner as the generation unit 204 according to Embodiment 1. Then, the generation unit 212 generates metadata of the moving image content, based on a part of the video data of the moving image content that corresponds to the playback range included in the received generation instruction, with use of all of the plurality of criteria, i.e., characteristic amounts of "the faces of people", "plants", "cars", and "buildings" (step S33).

Upon completing the processing of step S33, the generation unit 212 registers, into the generation log table 63 of the storage unit 203, a record in which (i) the identification information included in the received generation instruction, (ii) "1" as the processed information, and (iii) the playback range included in the received generation instruction as the generation range are associated with each other.

When judging that the conditions of step S32 are not satisfied (step S32: NO), the control unit 213 judges whether both of the following conditions are satisfied: the received playback time is greater than or equal to a second time (hereinafter, the second time is assumed to be "5:00 (five minutes)"

as one example); and the processed information corresponding to the received identification information of the moving image content, which is shown in the generation log table 63 of the storage unit 203, is "1" (step S34).

For example, assume that the control unit 213 receives the identification information "1" and a playback time "5:30". In this case, the playback time is greater than the second time, and a record in which the identification information "1" is associated with the processed information "1" is registered in the example of the generation log table 63 in FIG. 8B. Therefore, the control unit 213 judges that the conditions of step S34 are satisfied (step S34: YES).

Also, assume that, as described in the aforementioned example, the control unit 213 receives the identification information "4" and the playback time "0:32". In this case, since the playback time "0:32" is less than the second count, the control unit 213 judges that the conditions of step S34 are not satisfied (step S34: NO).

When judging that the conditions of step S34 are not satisfied (step S34: NO), the metadata generation management device 210 repeats the processing from step S2. When judging that the conditions of step S34 are satisfied (step S34: YES), the control unit 213 transmits a generation instruction for generating metadata to the generation unit 212. The generation instruction includes the identification information received from the count unit 211 and the updated playback range.

Upon receiving the generation instruction of the metadata, the generation unit 212 acquires, from the distribution device 100, moving image content indicated by the identification information included in the generation instruction, in the same manner as step S33 described above. Then, the generation unit 212 generates metadata of the moving image content, based on a part of the video data of the moving image content that is different from the part used in step S33, with use of all of the plurality of criteria, i.e., characteristic amounts of "the faces of people", "plants", "cars", and "buildings" (step S35). Here, the different part of the video data is obtained by subtracting the generation range in the generation log table 63 corresponding to the identification information included in the generation instruction from the playback range included in the generation instruction.

For example, assume that the generation instruction of metadata includes the identification information "1" and the playback range "0:00-5:30". In this case, the generation range of a record corresponding to the identification information "1" is "0:00-0:32" in the example of the generation log table 63 in FIG. 8B. Therefore, the generation unit 212 generates metadata based on a part corresponding to "0:32-5:30" in the video data of the acquired moving image content.

Upon completing the processing of step S35, the generation unit 212 updates the processed information corresponding to the identification information included in the received generation instruction to "2", in the generation log table 63 in the storage unit 203. Also, the generation unit 212 updates the generation range corresponding to this identification information to the playback range included in the received generation instruction, in the generation log table 63 in the storage unit 203.

Upon completing generation of metadata in either step S33 or step S35, the generation unit 212 performs the processing of step S8, in the same manner as the generation unit 204 according to Embodiment 1. Then, the metadata generation management device 210 repeats the processing from step S2.

As described above, when the playback time of moving image content is less than the first time, the metadata generation management device 210 does not generate any metadata other than initial metadata for the moving image content. When the playback time of moving image content is greater than or equal to the first time, the metadata generation management device 210 generates metadata based on a part of the video data of the moving image content that has been played back so far. When the playback time of moving image content is greater than or equal to the second time, the metadata generation management device 210 further generates metadata based on a part of the video data of the moving image content that has been played back since the previous generation of metadata.

As a result, the longer the playback time of moving image content is, the larger the processing amount is to perform the generation processing of metadata. This means that metadata is generated with efficient use of a limited resource provided for the generation processing of metadata.

[Modification 3]

In Embodiment 1, a description is provided of an example of using the number of times a request for playing back moving image content has been made by each terminal device (i.e., "playback count"), as the playback amount of moving image content. In Embodiment 2, a description is provided of an example of using the time length of a part of the moving image content that is actually played back, as the playback amount of moving image content.

The following describes one modification in which the playback counts of respective parts of moving image content, each having a unit time length (one minute in this example), are used as the playback amount of moving image content.

A metadata generation management device according to Modification 3 is different from the metadata generation management device 200 according to Embodiment 1 described above, with respect to a count unit, a generation unit, and a control unit whose functions are slightly changed from the count unit 202, the generation unit 204, and the control unit 205 of the metadata generation management device 200 according to Embodiment 1, and with respect to a playback amount table and a generation log table whose data structures are slightly changed from the playback amount table 50 and the generation log table 65 of the metadata generation management device 200 according to Embodiment 1. Therefore, the following mainly describes the changes.

<Data>

The following describes data used in the metadata generation management device according to Modification 3.

<Playback Amount Table>

FIG. 10A shows a data structure and content example of a playback amount table 56.

The playback amount table 56 shows, for each moving image content, the identification information 51 and a playback count 57 in association with each other. The playback amount table 56 is different from the playback amount table 50, in that the playback amount table 56 includes the playback count 57 instead of the playback count 52 in the playback amount table 50 according to Embodiment 1.

The playback count 57 is information indicating a playback count for each playback time period of corresponding moving image content. Each playback time period is information for specifying, in a case where the moving image content is divided into a plurality of parts each having a unit time length (one minute, in this example), a corresponding part of the moving image content on a playback time axis.

For example, the playback amount table 56 in FIG. 10A shows the playback counts of parts of moving image content whose identification information is "1", where the playback count corresponding to the playback time period of 0:00 or greater and less than 1:00 is "999", the playback count corresponding to the playback time period of 1:00 or greater and less than 2:00 is "451", and the playback count corresponding to the playback time period of 2:00 or greater and less than 3:00 is "320".

<Generation Log Table>

FIG. 10B shows a data structure and content example of a generation log table 65.

The generation log table 65 shows, for each moving image content, the identification information 61 and processed information 66 in association with each other. The generation log table 65 is different from the generation log table 60 according to Embodiment 1 in that the generation log table 65 includes processed information 66 instead of the processed information 62.

The processed information 66 indicates an amount of processing actually performed to generate metadata of corresponding moving content for each playback time period.

For example, the generation log table 65 in FIG. 10B shows the processed information of parts of moving image content whose identification information is "1", where the processed information corresponding to the playback time period of 0:00 or greater and less than 1:00 is "1", the processed information corresponding to the playback time period of 1:00 or greater and less than 2:00 is "0", and the processed information corresponding to the playback time period of 2:00 or greater and less than 3:00 is "0". In other words, metadata of the moving image content is generated based on the part of the moving image content in the playback time period of 0:00 or greater and less than 1:00, with use of characteristic amounts of "the faces of people" and "plants".

Also, the generation log table 65 shows the processed information of parts of moving image content whose identification information is "2", where the processed information pieces corresponding to the playback time periods of 0:00 or greater and less than 1:00, the part of 1:00 or greater and less than 2:00, and the part of 2:00 or greater and less than 3:00 are each "2". In other words, metadata of the moving image content is generated based on the parts of the moving image content in the playback time periods of 0:00 or greater and less than 3:00, with use of all of the plurality of criteria, i.e., characteristic amounts of "the faces of people", "plants", "cars", and "buildings".

<Operations>

The following describes operations of the metadata generation management device according to Modification 3.

Figure 11:
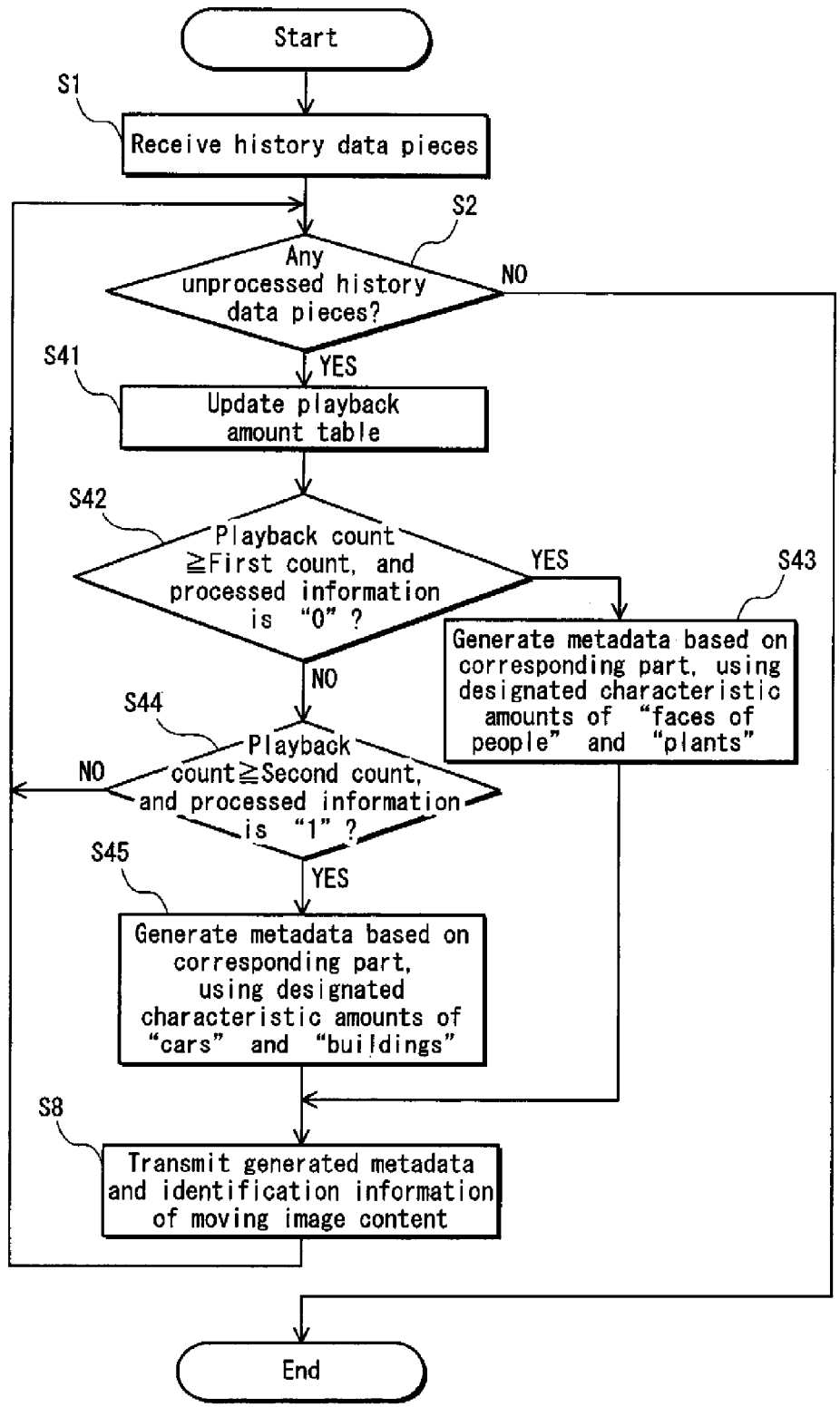
FIG. 11 is a flowchart showing processing for generating metadata, which is performed by a metadata generation management device according to Modification 3.

FIG. 11 is a flowchart showing processing for generating metadata, which is performed by the metadata generation management device according to Modification 3.

The generation processing performed by the metadata generation management device according to Modification 3 includes processing of steps S41 to S45, instead of steps S3 to S7 of the generation processing performed by the metadata generation management device 200 according to Embodiment 1.

Therefore, the following mainly describes the processing of steps S41 to S45.

The metadata generation management device according to Modification 3 performs the processing of steps S1 and S2 in the same manner as Embodiment 1. When judging that there are one or more unprocessed history data pieces (step S2: YES), the count unit according to Modification 3 updates the playback amount table 56 based on one of the unprocessed history data pieces (step S41).

Specifically, the count unit according to Modification 3 extracts identification information in the URL of moving image content included in the unprocessed history data piece.

When a record including the identification information is registered in the playback amount table 56, the count unit according to Modification 3 updates the playback count of a playback time period that is included in the record and that corresponds to the range of the transmitted moving image content included in the unprocessed history data piece, by incrementing the playback count by one. When a record including the identification information is not registered in the playback amount table 56, the count unit according to Modification 3 registers, into the playback amount table 56, a new record in which the extracted identification information is associated with (i) "1" as the playback count of a playback time period corresponding to the range of the transmitted moving image content included in the unprocessed history data piece and (ii) "0" as the playback counts of other playback time periods.

For example, assume that the identification information extracted by the count unit according to Modification 3 is "3", and that the range of the transmitted moving image content included in the unprocessed history data is "0:00-0:59". In this case, a record including the identification information "3" is already registered in the example of the playback amount table 56 in FIG. 10A. Therefore, the count unit according to Modification 3 updates the playback count of the record that corresponds to the playback time period of 0:00 or greater and less than 1:00, from "499" to "500".

Also, for example, assume that the identification information extracted by the count unit according to Modification 3 is "3", and that the range of the transmitted moving image content included in the unprocessed history data is "0:00-1:30". In this case, a record including the identification information "3" is already registered in the example of the playback amount table 56 in FIG. 10A. Therefore, the count unit according to Modification 3 updates the playback count of the record that corresponds to the playback time period of 0:00 or greater and less than 1:00, from "499" to "500", and also updates the playback count of the record that corresponds to the playback time period of 1:00 or greater and less than 2:00, from "0" to "1".

Also, for example, assume that the identification information extracted by the count unit according to Modification 3 is "100", that the range of the transmitted moving image content included in the unprocessed history data is "0:00-0:59", and that a record including the identification information "100" is not registered in the example of the playback amount table 56 in FIG. 10A. In this case, the count unit according to Modification 3 registers, into the playback amount table 56, a new record in which the identification information "100" is associated with (i) "1" as the playback count corresponding to the playback time period of 0:00 or greater and less than 1:00 and (ii) "0" as the playback counts corresponding to the other playback time periods.

Upon completing the processing of step S41, the count unit according to Modification 3 transmits, to the control unit according to Modification 3, the extracted identification information of the moving image content, and a pair of the updated playback count and information (hereinafter, "time period information") indicating a playback time period pertaining to the update. Note that in the case of registering a new record in the playback amount table 56, the count unit does not transmit a pair of an updated playback count and time period information if the updated playback count included in the pair is "0".

The control unit according to Modification 3 judges whether both of the following conditions are satisfied: the received playback count is greater than or equal to a first count ("500" in this example); and the processed information of a playback time period indicated by the received time period information is "0" in a record including the received identification information in the generation log table 65 of the storage unit 203 (step S42).

In a case where a record including the received identification information of the moving image content is not registered in the generation log table 65, the control unit according to Modification 3 judges that the processed information of a playback time period indicated by the received time period information is "0" in a record including the identification information in the generation log table 65 of the storage unit 203.

Assume that, as described in the aforementioned example, the control unit according to Modification 3 receives the identification information "3", time period information indicating "0:00 or greater and less than 1:00", and the playback count "500". In this case, the playback count is equal to the first time, and a record including the identification information "3" is not registered in the example of the generation log table 65 in FIG. 10B. Therefore, the control unit according to Modification 3 judges that the conditions of step S42 are satisfied (step S42: YES).

Also, assume that the control unit according to Modification 3 receives the identification information "100", time period information indicating "0:00 or greater and less than 1:00", and the playback count "1". In this case, since the playback count is less than the first time, the control unit according to Modification 3 judges that the conditions of step S42 are not satisfied (step S42: NO).

When judging that the conditions of step S42 are satisfied (step S42: YES), the control unit according to Modification 3 transmits a generation instruction for generating metadata to the generation unit according to Modification 3. Here, the generation instruction includes identification information and time period information that are received from the count unit according to Modification 3, and "1" as designation of an amount of processing required for generation of the metadata.

Upon receiving the generation instruction of metadata, the generation unit according to Modification 3 acquires, from the distribution device 100, moving image content indicated by the identification information included in the generation instruction in the same manner as the generation unit 204 according to Embodiment 1. Then, the generation unit according to Modification 3 generates metadata of the moving image content, based on a part of the video data of the moving image content that corresponds to a playback time period indicated by the time period information included in the received generation instruction, with use of characteristic amounts of "the faces of people" and "plants", from among all of the plurality of criteria (step S43). Here, the characteristic amounts of "the faces of people" and "plants" are used for the generation because the designation of an amount of processing required for generation of the metadata, which is included in the received generation instruction, is "1".

Upon completing the processing of step S43, the generation unit according to Modification 3 updates the processed information of the playback time period indicated by the time period information in the received generation instruction to "1", in a record including the identification information in the received generation instruction, in the generation log table 65 of the storage unit 203.

When a record including the identification information is not registered in the generation log table 65, the generation unit registers, into the generation log table 65, a new record in which the identification information is associated with (i) "1" as the processed information in the playback time period indicated by the time period information and (ii) "0" as the processed information in the other playback time periods.

When judging that the conditions of step S42 are not satisfied (step S42: NO), the control unit according to Modification 3 judges whether both of the following conditions are satisfied: the playback count is greater than or equal to a second count ("1000" in this example); and the processed information of a playback time period indicated by the time period information in a pair that includes the playback count is "1" in a record including the received identification information of the moving image content, in the generation log table 65 of the storage unit 203 (step S44).

For example, assume that the control unit according to Modification 3 receives the identification information "1", a pair of time period information indicating "0:00 or greater and less than 1:00" and the playback count "1000", and a pair of time period information indicating "1:00 or greater and less than 2:00" and the playback count "451". In this case, the playback count of a part of the moving image content "0:00 or greater and less than 1:00" is equal to the second count, and the processed information of the part "0:00 or greater and less than 1:00" in a record including the identification information "1" is "1" in the example of the generation log table 65 in FIG. 10B. Therefore, the control unit according to Modification 3 judges that the conditions of step S44 are satisfied (step S44: YES).

When judging that the conditions of step S44 are not satisfied (step S44: NO), the metadata generation management device according to Modification 3 repeats the processing from step S2. When judging that the conditions of step S44 are satisfied (step S44: YES), the control unit according to Modification 3 transmits a generation instruction for generating metadata to the generation unit according to Modification 3. Here, the generation instruction includes the identification information received from the count unit according to Modification 3, time period information, and "2" as designation of an amount of processing required for the generation of metadata.

Upon receiving the generation instruction of metadata, the generation unit according to Modification 3 acquires, from the distribution device 100, moving image content indicated by the identification information included in the generation instruction in the same manner as the generation unit 204 according to Embodiment 1. Then, the generation unit according to Modification 3 generates metadata of the moving image content, based on a part of the video data of the moving image content that corresponds to a playback time period indicated by the time period information included in the received generation instruction, with use of characteristic amounts of "cars" and "buildings" among the plurality of criteria (step S45). Here, the characteristic amounts of "cars" and "buildings" are used for the generation because the designation of an amount of processing required for generation of the metadata, which is included in the received generation instruction, is "2".

Upon completing the processing of step S45, the generation unit according to Modification 3 updates the processed information of the playback time period indicated by the time period information in the received generation instruction to "2", in a record including the identification information in the received generation instruction, in the generation log table 65 of the storage unit 203.

Upon completing generation of metadata in either step S43 or step S45, the generation unit according to Modification 3 performs the processing of step S8, in the same manner as the generation unit 204 according to Embodiment 1. Then, the metadata generation management device according to Modification 3 repeats the processing from step S2.

Embodiment 3

In each of the embodiments 1 and 2 including various modifications described above, it is the metadata generation management device that generates metadata. In this embodiment, however, a description is provided of an example where a terminal device that has transmitted a playback request generates metadata.

<Structure>

Figure 12:
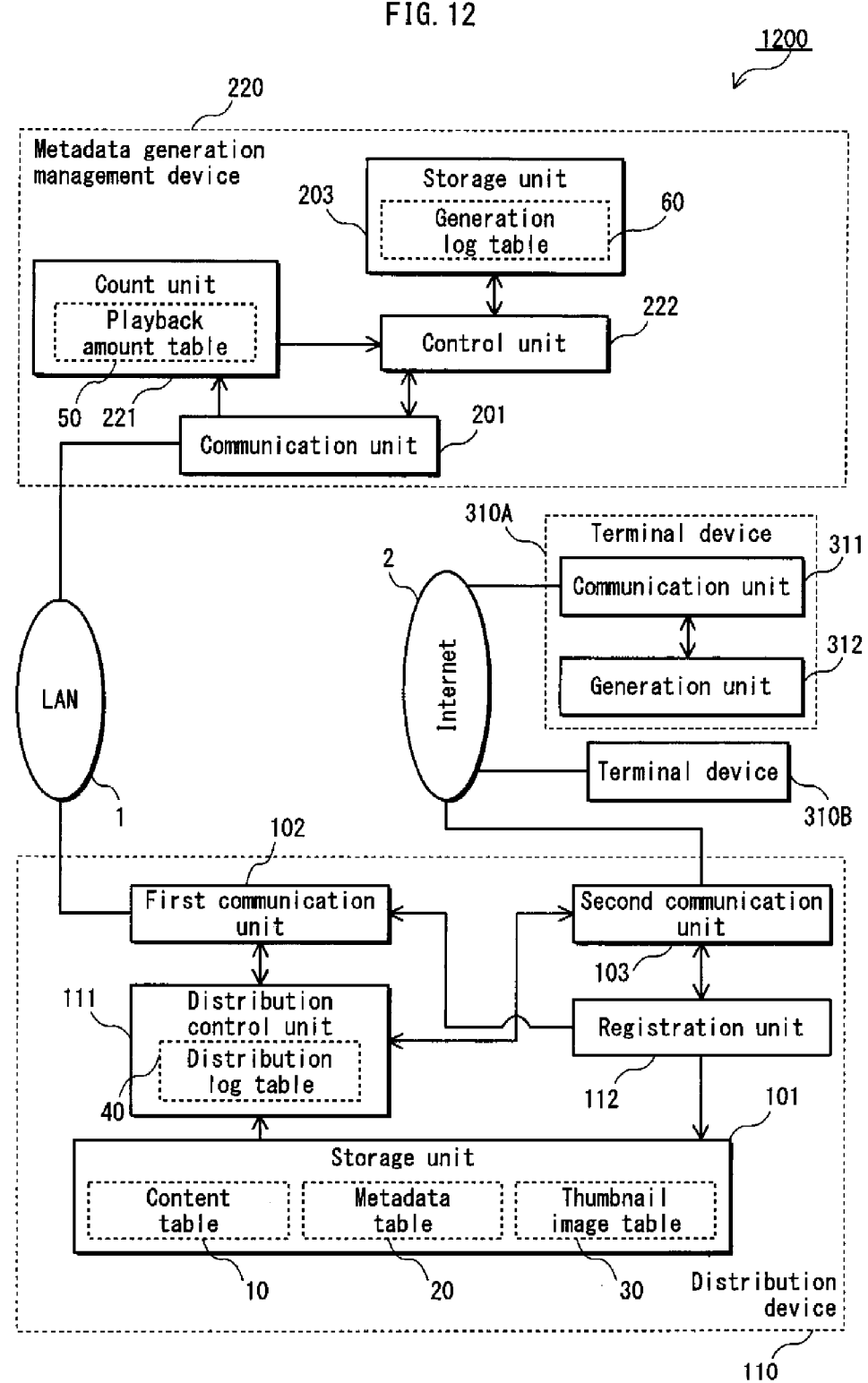
FIG. 12 shows a structure of a metadata generation system 1200 according to Embodiment 3.

FIG. 12 shows a structure of a metadata generation system 1200 according to Embodiment 3.

As shown in FIG. 12, the metadata generation system 1200 includes a distribution device 110, a metadata generation management device 220, and terminal devices 310A and 310B.

Since the terminal devices 310A and 310B have the same functions, the following description is provided with the terminal device 310A as an example.

As shown in FIG. 12, the distribution device 110 includes a distribution control unit 111 instead of the distribution control unit 105 in the distribution device 100 according to Embodiment 1, and a registration unit 112 instead of the registration unit 104 and the update unit 106 in the distribution device 100.

Instead of the distribution control unit 105 according to Embodiment 1 that transmits history data pieces on a predetermined schedule, the distribution control unit 111 has the following functions. Upon receiving a request for playing back moving image content from either of the terminal devices (310A or 310B), the distribution control unit 111 transmits the URL included in the playback request to the metadata generation management device 220 via the first communication unit 102. Then, upon receiving a generation instruction for generating metadata from the metadata generation management device 220, the distribution control unit 111 transmits the generation instruction and moving image content pertaining to the playback request, to the terminal device that has transmitted the playback request, as described below.

In addition to the functions of the registration unit 104 according to Embodiment 1, the registration unit 112 has the following functions. The registration unit 112 receives metadata via the second communication unit 103. The metadata is generated by a terminal device that has transmitted a request for playing back moving image content, in response to a generation instruction of metadata transmitted by the distribution control unit 111. Then, the registration unit 112 additionally registers the generated metadata into the metadata table 20, in the same manner as the update unit 106 according to Embodiment 1.

As shown in FIG. 12, the metadata generation management device 220 is different from the metadata generation management device 200 according to Embodiment 1, in that the metadata generation management device 220 includes a count unit 211 and a control unit 222 instead of the count unit 202 and the control unit 205, and does not include the generation unit 204.

The count unit 211 basically has the similar functions as the count unit 202 according to Embodiment 1. However, the count unit 211 is different from the count unit 202 in that the operations of the count unit 211 are triggered by the reception of a URL from the distribution device 110.

The control unit 222 basically has the similar functions as the control unit 205 according to Embodiment 1. However, the control unit 222 is different from the control unit 205 in that the control unit 222 transmits, via the distribution device 110, a generation instruction for generating metadata to a terminal device (310A or 310B) that has transmitted a request for playing back moving image content. Also, the control unit 222 updates the generation log table 60 of the storage unit 203, upon completion of generation of metadata by a terminal device (310A or 310B) that has transmitted a request for playing back moving image content.

The terminal device 310A has the similar functions as each terminal device (300A, 300B) according to Embodiment 1. In addition to these functions, the terminal device 310A generates metadata in response to a generation request for generating the metadata, which is transmitted from the metadata generation management device 220 via the distribution device 110.

As shown in FIG. 12, the terminal device 310A particularly includes a communication unit 311 and a generation unit 312.

The communication unit 311 transmits and receives data to and from the distribution device 110 via the Internet 2. Although not mentioned above, each terminal device (300A, 300B) described in Embodiment 1 of course includes a communication unit that has the similar functions as the communication unit 311.

The generation unit 312 has a function of generating metadata based on a generation instruction for generating metadata, in the same manner as the generation unit 204 in the metadata generation management device 200 according to Embodiment 1. The generation unit 312 receives a generation instruction for generating metadata together with moving image content, from the distribution device 110 via the communication unit 311, and generates metadata based on the received moving image content. The generation unit 312 transmits the generated metadata to the distribution device 110 via the communication unit 311.

<Operations>

The following describes operations of the metadata generation management device 220 and the terminal devices according to Embodiment 3.

The following describes a case where a playback request is transmitted from the terminal device 310A, i.e., a case where the terminal device 310A is a viewing terminal FIG. 13 is a flowchart showing processing for judging whether to generate metadata, which is performed by the metadata generation management device 220, and processing for generating metadata by the terminal device 310A, according to Embodiment 3.

First, a description is provided of the processing for judging whether to generate metadata, which is performed by the metadata generation management device 220.

The distribution control unit 111 of the distribution device 110 receives a request for playing back moving image content from the terminal device 310A via the second communication unit 103. Upon receiving the playback request, the distribution control unit 111 transmits a URL included in the playback request to the metadata generation management device 220 via the first communication unit 102.

The count unit 221 of the metadata generation management device 220 receives the URL via the communication unit 201 (step S51), and updates the playback amount table 50 (step S52), in the same manner as the count unit 202 according to Embodiment 1. Specifically, the count unit 221 extracts identification information in the URL. Then, when a record including the identification information is registered in the playback amount table 50, the count unit 221 updates a playback count included in the record by incrementing the playback count by one. When a record including the identification information is not registered in the playback amount table 50, the count unit 221 registers, into the playback amount table 50, a new record in which the identification information is associated with "1" as a playback count.

Upon completing the processing of step S52, the count unit 221 transmits, to the control unit 222, the extracted identification information of the moving image content and the updated playback count. Upon receiving the identification information and the playback count, the control unit 222 judges whether the conditions of step S4 are satisfied (step S4), in the same manner as the control unit 205 according to Embodiment 1.

When judging that the conditions of step S4 are satisfied (step S4: YES), the control unit 222 transmits a generation instruction for generating metadata to the distribution device 110 via the communication unit 201 (step S53). Here, the generation instruction includes the extracted identification information of the moving image content and "1" as designation of an amount of processing required for generation of the metadata. Upon completing the transmission of the generation instruction, the metadata generation management device 220 ends the processing for judging whether to generate metadata.

Upon receiving the generation instruction of the metadata via the first communication unit 102, the distribution control unit 111 of the distribution device 110 transmits the generation instruction to the terminal device 310A, together with the moving image content pertaining to the playback request.

When judging that the conditions of step S4 are not satisfied (step S4: NO), the control unit 222 judges whether the conditions of step S6 are satisfied (step S6), in the same manner as the control unit 205 according to Embodiment 1.

When the control unit 222 judges that the conditions of step S6 are not satisfied (step S6: NO), the metadata generation management device 220 ends the processing for judging whether to generate metadata, without transmitting a generation instruction for generating metadata. This means that the distribution control unit 111 of the distribution device 110 does not receive a generation instruction. Therefore, if, for example, the distribution control unit 111 does not receive a generation instruction within a predetermined time from the transmission of the URL, which is received by the count unit 221 in the aforementioned step S51, the distribution control unit 111 transmits only the moving image content pertaining to the playback request to the terminal device 310A. As a result, the terminal device 310A only performs playback of the moving image content, and not generation of metadata, in the same manner as the terminal device 300A according to Embodiment 1.

When judging that the conditions of step S6 are satisfied (step S6: YES), the control unit 222 transmits a generation instruction for generating metadata to the distribution device 110 via the communication unit 201 (step S54). Here, the generation instruction includes the extracted identification information of the moving image content and "2" as designation of an amount of processing required for generation of the metadata. Then, the metadata generation management device 220 ends the processing for judging whether to generate metadata.

Upon receiving the generation instruction of the metadata via the first communication unit 102, the distribution control unit 111 of the distribution device 110 transmits the generation instruction to the terminal device 310A, together with the moving image content pertaining to the playback request.

The following describes the processing for generating metadata, which is performed by the terminal device 310A.

The generation unit 312 of the terminal device 310A receives, from the distribution device 110 via the communication unit 311, a generation instruction for generation metadata, which is transmitted by the control unit 222 of the metadata generation management device 220 in the aforementioned step S53 or S54, and moving image content pertaining to a playback request (step S61). Upon receiving the generation instruction and the moving image content, the generation unit 312 generates metadata with use of characteristic amounts designated by the generation instruction, based on the whole video data of the moving image content (step S62).

In other words, when the designation of an amount of processing required for generation of metadata, which is included in the received generation instruction, is "1", the characteristic amounts of "the faces of people" and "plants" are used to generate metadata, from among the plurality of criteria. When the designation of an amount of processing required for generation of metadata, which is included in the received generation instruction, is "2", the characteristic amounts of "cars" and "buildings" are used to generate metadata, from among the plurality of criteria.

Upon completing the processing of step S62, the generation unit 312 transmits the generated metadata, the identification information included in the generation instruction, and processed information, to the distribution device 110 via the communication unit 311 (step S63). Then, the terminal device 310A ends the processing for generating metadata.

Note that "1" is designated as the processed information when the designation of an amount of processing required for generation of metadata, which is included in the received generation instruction, is "1". Also, "2" is designated as the processed information when the designation of an amount of processing required for generation of metadata, which is included in the received generation instruction, is "2".

Upon receiving the metadata, the identification information of the moving image content, and the processed information from the terminal device 310A via the second communication unit 103, the registration unit 112 of the distribution device 110 additionally registers the metadata to metadata that corresponds to the identification of the moving image content in the metadata table 20 of storage 101.

Also, the registration unit 112 transmits the identification information of the moving image content and the processed information to the metadata generation management device 220 via the first communication 102. Upon receiving the identification information and the processed information via the communication unit 201, the control unit 222 of the metadata generation management device 220 updates processed information that corresponds to the received identification information in the generation log table 60 of the storage unit 203, to the received processed information.

<Supplementary Remarks>

The metadata generation management device and the metadata generation system according to the present invention have been described based on Embodiments 1-3 and Modifications 1-3 (hereinafter, simply and collectively referred to as "embodiments"). However, it is evident that the following variations are possible, and the present invention is not limited to the metadata generation management device and the metadata generation management system described in the embodiments above.

(1) In the embodiments described above, the metadata generation system includes the distribution device, the metadata generation management device, and the terminal devices. However, the functions of these devices (i.e., the distribution device, the metadata generation management device, and the terminal devices) may be realized by one device (hereinafter, "recording/playback device 500").

Figure 14:
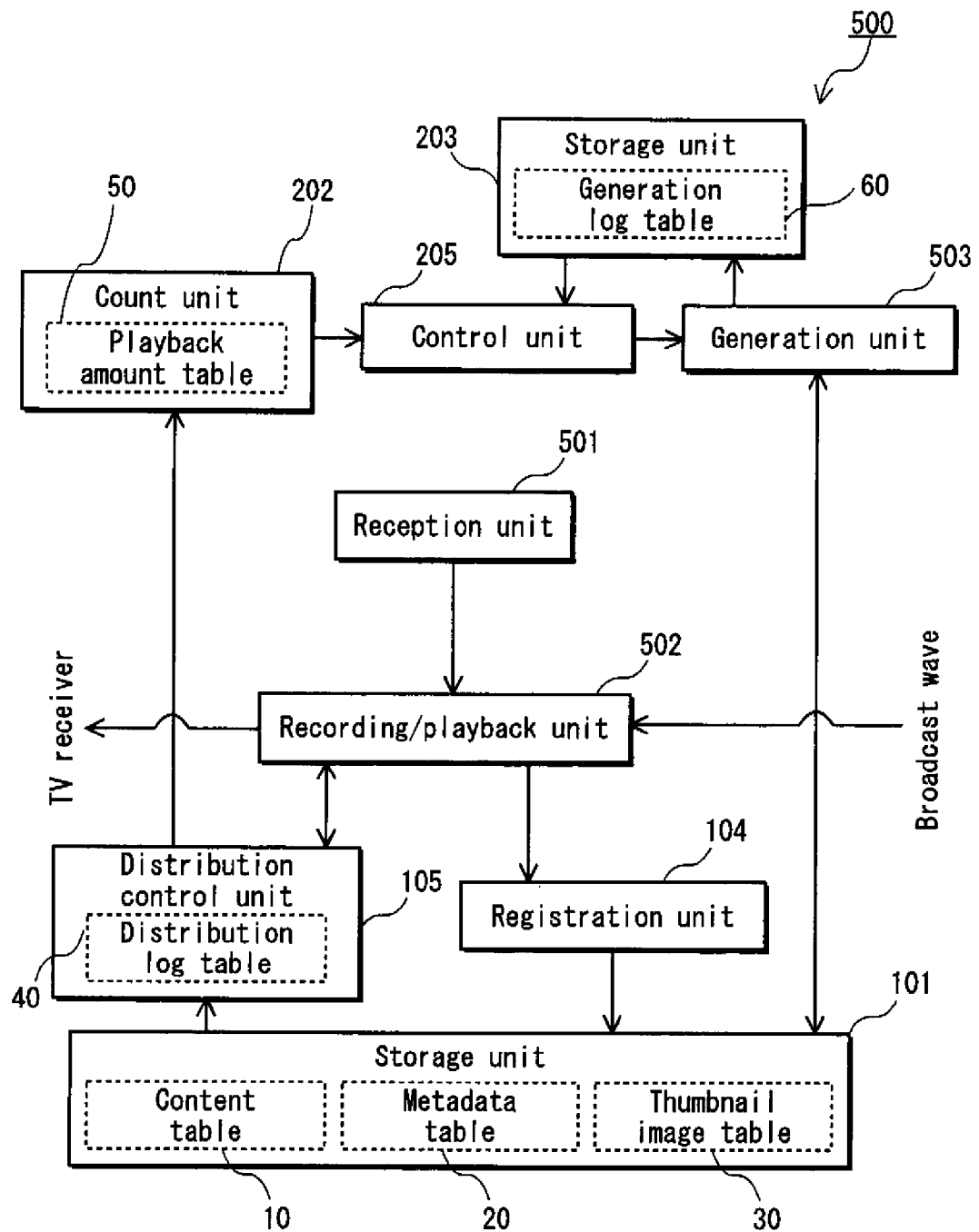
FIG. 14 is a block diagram showing functional components of a recording/playback device 500.

FIG. 14 is a block diagram showing functional components of the recording/playback device 500.

As shown in FIG. 14, the recording/playback device 500 includes the storage unit 101, the registration unit 104, the distribution control unit 105, the count unit 202, the storage unit 203, the control unit 205, a reception unit 501, a recording/playback unit 502, and a generation unit 503.

The recording/playback device 500 includes a memory and a processor (not shown). The functions of the registration unit 104, the distribution control unit 105, the count unit 202, the control unit 205, the recording/playback unit 502, and the generation unit 503 are realized by the processor executing a program on the memory.

Here, the storage unit 101, the registration unit 104, and the distribution control unit 105 are the same as those in the distribution device 100 according to Embodiment 1. Also, the count unit 202, the storage unit 203, and the control unit 205 are the same as those in the metadata generation management device 200 according to Embodiment 1. Therefore, the following describes functional components of the recording/playback device 500 that are other than those listed above.

The reception unit 501 receives a user operation from a conventional input device such as a remote controller, and transmits a signal corresponding to the user operation to the recording/playback unit 502.

Depending on the signal received from the reception unit 501, the recording/playback unit 502 either (i) receives a broadcast wave, and registers a program (moving image content) into the content table 10 of the storage unit 101 or (ii) acquires moving image content already registered in the content table 10, plays back the moving image content, and outputs the moving image content to a television receiver.

The registration of the moving image content to the content table 10 is realized by transmitting, to the registration unit 104, a request for registering the moving image content, in the same manner as the terminal device 300A according to Embodiment 1. Also, the acquisition of the registered moving image content from the content table 10 is realized by transmitting, to the distribution control unit 105, a playback request for playing back the moving image content, in the same manner as the terminal device 300A according to Embodiment 1.

The generation unit 503 basically has the similar functions as the generation unit 204 according to Embodiment 1. However, the generation unit 503 is different from the generation unit 204 in that the generation unit 503 directly adds the generated metadata to the metadata table 20 of the storage unit 101, thereby registering the metadata into the metadata table 20.

The recording/playback device 500 performs metadata generation processing in the same manner as the metadata generation management device 200 according to Embodiment 1, as shown in FIG. 4. Therefore, a detailed description of the operations of the recording/playback device 500 is omitted here. However, the following operations are of course different from Embodiment 1: the distribution control unit 105 directly transfers data to the count unit 202; and the generation unit 503 directly adds the generated metadata to the metadata table 20, thereby registering the metadata into the metadata table 20, as described above.

(2) In Embodiment 1, when metadata is generated for the first time for moving image content, the conditions of step S4 are satisfied even when the playback count of the moving image content is greater than or equal to the second count (step S4: YES). Therefore, at first, metadata is generated with use of characteristic amounts of "the faces of people" and "plants" (step S5). However, it is possible to perform processing for judging whether the playback count is greater than or equal to the second count when the conditions of step S4 are satisfied (step S4: YES). Then, when it is judged affirmatively (i.e., the playback count is greater than or equal to the second count), metadata may be generated with use of all characteristic amounts, and the processed information may be updated to "2". When it is judged negatively (i.e., the playback count is less than the second count), the processing of step S5 may be performed.

The aforementioned structure is also applicable to the other embodiments and modifications.

(3) The generation processing of metadata (see FIG. 4) described in Embodiment 1 may be combined with the generation processing of metadata (see FIG. 9) described in Embodiment 2.

In this case, it is necessary for the generation log table 60 to store two pieces of processed information for each moving image content, instead of one piece of processed information for each moving image content as described in Embodiment 1. One of the two pieces of processed information (hereinafter, "first processed information") indicates an amount of processing actually performed to generate metadata based on video data. The other piece of processed information (hereinafter, "second processed information") indicates an amount of processing actually performed to generate metadata based on audio data.

Also, it is necessary to replace the processed information referred to in the processing of step S6 in FIG. 4 with the first processed information, and to add the processing of steps S32 to S35 in FIG. 9 after steps S5 and S7 and before step S8 in FIG. 4. In this case, it is necessary to replace the processed information referred to in the processing of step S34 with the second processed information. Also, in the processing of step S8, it is necessary to transmit metadata generated in step S5 or S7 and metadata generated in step S33 or S35.

(4) In the embodiments described above, the metadata generation device is connected to the distribution device via the LAN 1. However, the metadata generation device may be connected to the distribution device via a cable. Also, the metadata generation device and the distribution device may be realized by one device.

(5) In the embodiments described above, the initial metadata includes data pieces indicating a title, a playback time length, a file format, and a registration date and time. However, other data pieces, such as an explanation about the details of moving image content, a tag, and a category to which the moving image content belongs, may be included in the initial metadata. Also, designation of such data pieces may be performed via the registration screen, in the same manner as the designation of a title.

(6) In the embodiments described above, when the user of the viewing terminal inputs, on the search screen, specific metadata indicating the characteristics of moving image content which he/she desires to search for, the viewing terminal transmits a request for searching for the moving image content, which includes the designation of the specific metadata, to the distribution device. Upon receiving the search request of the moving image content from the viewing terminal, the distribution device searches for moving image contents corresponding to the specific metadata designated by the search request. However, it is not limited to such. For example, the viewing terminal may be modified to be capable of transmitting, to the distribution device, a request for searching for moving image content, which does not include designation of specific metadata. Then, upon receiving the search request, the distribution control unit of the distribution device may search, for example, for a predetermined number of moving image contents in order of registration date and time from newest (i.e., from identification information having the largest value) to oldest.

In the embodiments described above, the playback amount table is held by the count unit. However, the playback amount table may be stored in a place directly accessible by the distribution device, such as a network storage connected to the LAN 1. Then, in the case of receiving a request for searching for moving image content, which does not include designation of specific metadata, the distribution control unit of the distribution device may refer to the playback amount table in the network storage, and may either search for moving image contents that have been played back more than a predetermined count or a predetermined number of moving image contents in descending order of playback count. Also, the aforementioned search may be realized by acquiring, by making an inquiry to the metadata generation management device, either (i) the identification information pieces of moving image contents that have been played back more than a predetermined count or (ii) pieces of identification information of a predetermined number of moving image contents in descending order of playback count, as well as storing the playback amount table in a place directly accessible by the distribution device.

(7) As one example of content according to the present invention, moving image content including video data and audio data is described in the above embodiments. However, other content, for example, still image data or audio data may be equally employed for the present invention.

(8) The metadata generation system according to the above embodiments includes one distribution device. However, it may include a plurality of distribution devices.

In this case, it is preferable that the tables in the storage unit 101 are stored in a place directly accessible by the distribution devices, such as a network storage connected to the LAN 1 or the Internet 2.

Also, the plurality of distribution devices may be connected to form a hierarchical structure, with the distribution device described in the above embodiments at the top. The plurality of distribution devices may receive requests for playing back moving image contents from the terminal devices, transmit moving image contents corresponding to the playback requests, and generate history data pieces. The history data pieces may be collectively registered into the distribution device according to the above embodiments, which is at the top of the hierarchical structure.

(9) In Embodiment 2, the time length of a part of moving image content that is actually played back is used as the playback amount of the moving image content. However, it is possible, for example, to control whether to generate metadata, and to control an amount of processing performed for the generation, based on the ratio of the time length of a part of moving image content that is actually played back with respect to the playback time length of the whole moving image content.

(10) In the embodiments described above, the distribution control unit of the distribution device transmits newly registered history data pieces to the metadata generation management device based on a predetermined schedule. However, the transmission may be performed each time history data is generated. The count unit of the metadata generation management device may perform processing each time the count unit receives history data. Alternatively, the count unit may receive and hold history data pieces, and perform processing on a predetermined schedule.

In the embodiments described above, the distribution log table is held by the distribution control unit of the distribution device. However, the distribution log table may be stored in a place directly accessible by the metadata generation management device, such as a network storage connected to the LAN 1. Then, upon detecting an update of the distribution log table or upon receiving a notice of an update thereof from the distribution device, the metadata generation management device may acquire history data from the distribution log table, and perform processing for the history data. Also, the metadata generation management device may check the distribution log table at a predetermined time interval, acquire history data pieces that have been updated since the previous check, and perform processing for the history data pieces.

(11) In the embodiments described above, the operations of the control unit of the metadata generation management device are triggered by the reception of data, such as the identification information of moving image content, from the count unit. However, the control unit may hold received data pieces in a memory of the metadata generation management device, and perform processing collectively for the data pieces on a predetermined schedule. Alternatively, the count unit may store data in the memory, and transmit, to the control unit, a notification indicating that the data is stored therein. Then, upon receiving the notification, the control unit may acquire the data from the memory and perform processing for the data.

(12) In Modification 3, the playback count of a playback time period in the playback amount table 56 is incremented by one, even when a part of moving image content that corresponds to the playback time period (e.g., 0:00 or greater and less than 1:00) is partially (e.g., 0:00-0:30) played back. However, the playback count of a playback time period may be incremented by one only when a part of moving image content that corresponds to the playback time period is fully played back.

(13) In Embodiment 2, when the conditions of step S32 are satisfied (step S32: YES), the processing of step S33 is performed; and when the conditions of step S34 are satisfied (step S34: YES), the processing of step S35 is performed, as shown in FIG. 9. However, it is possible to perform the processing of step S5 in FIG. 4, the processing of step S11 in FIG. 5, or the processing of step S21 in FIG. 6, instead of the processing of step S33. Also, it is possible to perform the processing of step S7 in FIG. 4, the processing of step S12 in FIG. 5, or the processing of step S22 in FIG. 6, instead of the processing of step S34.

(14) The content of Embodiment 2 may be applied to Embodiment 3. In other words, processing may be performed with use of the playback amount table 53 and the generation log table 63 in FIG. 8, instead of the playback amount table 50 and the generation log table 60. Also, the processing of steps S32 and S34 in FIG. 9 may be performed instead of the processing of steps S4 and S6 in FIG. 13.

(15) The playback amount of moving image content is not limited to the examples described in the embodiments. For example, the playback amount may be the total playback time length of moving image content. Then, whether to generate metadata and an amount of processing performed for the generation may be controlled based on the total playback time length. The total playback time length of moving image content is calculated in the following manner. For example, in a case where a 5-minute moving image content is fully played back three times, the total playback time length of the moving image content is: 5 minutes×three times=15 minutes.

(16) In Embodiment 1, when the playback count is greater than or equal to the first count (step S4: YES), metadata is generated with use of the characteristic amounts of "the faces of people" and "plants" (step S5); and when the playback count is greater than or equal to the second count (step S6: YES), metadata is generated with use of "cars" and "buildings" (step S7), as shown in FIG. 4. However, generation of metadata does not always need to be divided into two stages. For example, when the playback count is greater than or equal to a third count, metadata may be further generated with use of characteristic amounts other than those mentioned above (e.g., characteristic amounts of dogs and cats, or colors such as red, blue, and yellow). Alternatively, when the playback count is greater than or equal to a fourth count (e.g., 750 times) at the first stage of judging whether to generate metadata, metadata may be generated with use of "the faces of people", "plants", "cars", and "buildings".

The aforementioned structure is also applicable to the other embodiments and modifications.

(17) In Modification 1, when the playback count is greater than or equal to the first count (step S4: YES), metadata is generated based on the preceding part of video data (step S11); and when the playback count is greater than or equal to the second count (step S6: YES), metadata is generated based on the subsequent part of the video data (step S12). However, video data does not always need to be divided into two equal parts, i.e., the preceding and subsequent parts, to generate metadata. For example, video data may be divided into three or more parts, and the generation processing may be separately performed for one part of the video data and the rest of the parts of the video data.

Also, in a case where generation of metadata is performed in each of three or more stages as described above, video data may be divided into the same number of parts as the number of stages or divided by the same unit time slots. Then, metadata may be generated based on a different part of the video data for each stage.

(18) In the embodiments described above, when starting to receive the data pieces of the moving image content, the viewing terminal activates a preinstalled application for playing back moving images, and plays back the moving image content. However, it is not limited to such. For example, the distribution control unit of the distribution device may generate a screen for a search result in a manner that an application for playing back moving image content is included in the screen. Then, the viewing terminal may play back moving image content with use of the application included in the screen.

In the embodiments described above, the distribution control unit of the distribution device acquires moving image content from the content table 10 in response to a playback request from the viewing terminal, and transmits the moving image content without modification to the viewing terminal. However, the distribution control unit may convert moving image content into a format suitable for the application for playing back moving image content, and transmits the moving image content to the viewing terminal.

(19) In the embodiments described above, examples are given as follows: the first count is 500 times; the second count is 1000 times; the first time is one minute; and the second time is five minutes. However, the examples are not limited to those given above. For example, the first count may be once, 1000 times, etc., and the second count may be 10 times, 10,000 times, or any number of times as long as the count is larger than the first count. Also, the first time may be 30 seconds, 5 minutes, etc., and the second time may be 10 minutes, 20 minutes, or any length of time as long as the second time is longer than the first time. However, it is preferable that the first and second times are determined according to the playback time length of the whole moving image content that is to be registered. For example, in a case where a restriction is imposed on registration of moving image content having a time length of 10 minutes or longer, it is of course necessary to set the first and second times within the range of less than 10 minutes. Also, in a case where an average playback time length of moving image content is approximately 5 minutes, the first and second times are preferably set within the range of less than 5 minutes.

(20) Upon receiving a playback request from a terminal device, the distribution device 110 according to Embodiment 3 transmits, to the terminal device, moving image content pertaining to the playback request, together with a generation instruction for generating metadata, which is received from the metadata generation management device 220. However, it is not limited to such. For example, the distribution device 110 may acquire, from the distribution log table 40, the IP address of each terminal device from which a playback request is received in the past. Then, independently of a playback request, the distribution device 110 may transmit a generation instruction for generating metadata and moving image content pertaining to the generation instruction to a terminal device currently communicable so as to cause the terminal device to generate metadata.

(21) In Embodiment 3, the generation unit 312 of each terminal device generates metadata based on moving image content pertaining to a playback request, in response to a generation instruction for generating metadata. However, instead of this operation or together with this operation, it is possible to enable the user of the terminal device to freely input metadata of moving image content that is being played back. Then, the terminal device may transmit the metadata that has been input and the identification information of the moving image content that is being played back to the distribution device, so that the distribution device can register the metadata into the metadata table. This realizes generation of metadata having higher accuracy since a user who has actually viewed moving image content registers metadata of the moving image content into the metadata table.

Furthermore, in registering the metadata into the metadata table, the metadata may be associated with a position at which the metadata was input, on the playback time axis of the moving image content.

(22) In the embodiments described above, the control unit of the metadata generation management device judges whether to generate metadata, based on the playback amount of moving image content and the generation log table in the storage unit 203. However, the judgement may be performed based on the playback amount of moving image content alone.

This is because it is not necessary to refer to the generation log table if, for example, the playback count matches the fourth count (e.g., 750 times) at the first stage of judging whether to generate metadata, and metadata is generated with use of the characteristic amounts of "the faces of people", "plants", "cars", and "buildings", as described in (16) above.

(23) All or part of the components described in the above embodiments may be realized by a single-chip or a multi-chip integrated circuit, a computer program, or any other form.

(24) A program for causing a CPU (Central Processing Unit) to perform the processing for generating metadata (FIGS. 4-6, FIG. 9, and FIG. 11), and the processing for judging whether to generate metadata and the processing for generating metadata, which are shown in FIG. 13, may be distributed by being recorded on a recording medium or via various channels. Such a recording medium may be an IC (Integrated Circuit) card, an optical disc, a flexible disk, a ROM (Read Only Memory), a flash memory, a hard disk, or the like. The distributed program is made available for use by being stored in a memory readable by a CPU in a device. The functions of the metadata generation management device and the terminal devices 310A and 310B described in the above embodiments are realized by the CPU performing the program.

(25) All or some of the above variations from (1) to (24) may be combined and applied to the metadata generation management device and the metadata generation system according to the embodiments described above.

The present invention can be used to manage generation of metadata that indicates characteristics of content.

REFERENCE SIGNS LIST

1 LAN
2 Internet
100, 110 distribution device
101, 203 storage unit
102 first communication unit
103 second communication unit
104, 112 registration unit
105, 111 distribution control unit
106 update unit
200, 210, 220 metadata generation management device
201, 311 communication unit
202, 211, 221 count unit
204, 212, 312, 503 generation unit
205, 213, 222 control unit
300A, 300B, 310A, 310B terminal device
500 recording/playback device
501 reception unit
502 recording/playback unit
1000, 1100, 1200 metadata generation system

The invention claimed is:

1. A metadata generation management device, comprising:
a non-transitory memory device that stores a program; and
a processor that executes the program and causes the metadata generation management device to operate as:
a count unit that measures a playback amount of content, which is an amount of content that has been played back;
a control unit that controls whether to output an instruction for generating metadata based on the playback amount of the content, the metadata being information searched for based on a request for searching for the content by a user, indicating characteristics of the content and being associated with the content; and
a generation unit that performs generation processing for generating the metadata in determining the instruction is output from the control unit, wherein
the control unit includes processing level information in the instruction and outputs the instruction, the processing level information indicating the first level processing is to be performed in determining the playback amount of the content is less than a predetermined playback amount, and indicating that second level processing is to be performed in determining the playback amount is greater than or equal to the predetermined playback amount, the second level processing requiring a larger processing amount than the first level processing, and
the generation unit performs, as the generation processing of the metadata, one of the first level processing and the second level processing indicated by the processing level information in the instruction output from the control unit.

2. The metadata generation management device of claim 1, wherein the playback amount of the content is a number of times a playback request has been made for the content, and
the control unit outputs the instruction only when the number of times the playback request has been made is greater than or equal to a predetermined value.

3. The metadata generation management device of claim 2, wherein
the generation unit performs the generation processing of the metadata with use of one or more criteria for extracting specific characteristics from the content, and
a number of criteria used for the generation processing corresponds to one of the first level processing and the second level processing indicated by the processing level information.

4. The metadata generation management device of claim 2, wherein
the content is a stream having a playback time axis, and
the generation unit performs the generation processing of the metadata based on a part of the content having a time length corresponding to one of the first level processing and the second level processing indicated by the processing level information.

5. The metadata generation management device of claim 2, wherein
the content includes video data and audio data, and
the generation unit determines whether to use either or both of the video data and the audio data for the generation of the metadata, based on one of the first level processing and the second level processing indicated by the processing level information, and performs the generation processing of the metadata based on data determined to be used.

6. The metadata generation management device of claim 1, wherein
the playback amount of the content is a time length of a part of the content that has been played back, and
the control unit outputs the instruction only when the time length is greater than or equal to a predetermined value.

7. The metadata generation management device of claim 6, further comprising:
a generation unit, wherein
the instruction includes part information indicating the part of the content that has been played back, and
the generation unit performs generation processing for generating the metadata, based on the part indicated by the part information.

8. The metadata generation management device of claim 1, wherein
the playback amount of the content is a number of times each of a plurality of parts constituting the content has been played back, based on a playback request for the content, and
the control unit outputs the instruction only when any of the parts of the content has been played back greater than or equal to a predetermined number of times.

9. The metadata generation management device of claim 8, further comprising:
a generation unit, wherein
the instruction includes part information indicating the part of the content that has been played back greater than or equal to the predetermined number of times, and
the generation unit that performs generation processing for generating the metadata, based on the part indicated by the part information.

10. The metadata generation management device of claim 1, wherein the second level processing is composed of the first level processing and other processing.

11. A metadata generation system including a distribution device for distributing content in response to a playback request, a terminal device for making the playback request to the distribution device and playing back the content distributed from the distribution device, and a metadata generation management device, wherein
the metadata generation management device comprises:
a non-transitory memory device that stores a program; and
a processor that executes the program and causes the metadata generation management device to operate as:
a count unit that measures a playback amount of the content, by acquiring information indicating that the distribution device has received the playback request; and
a control unit that controls whether to output an instruction for generating metadata based on the playback amount of the content, the metadata being information searched for based on a request for searching for the content by a user, indicating characteristics of the content and being associated with the content, and
the terminal device comprises:
a generation unit that performs generation processing for generating the metadata in determining receipt of the instruction from the control unit of the metadata generation management device, wherein
the control unit includes processing level information in the instruction and outputs the instruction in determining the playback request is made by the terminal device to the distribution device, the processing level information indicating that first level processing is to be performed in determining the playback amount of the content is less than a predetermined playback amount, and indicating that second level processing is to be performed in determining the playback amount is greater than or equal to the predetermined playback amount, the second level processing requiring a larger processing amount than the first level processing, and
the generation unit performs, as the generation processing of the metadata, one of the first level processing and the second level processing indicated by the processing level information in the instruction output from the control unit, the generation processing of the metadata being performed with use of the content distributed in response to the playback request made to the distribution device.

12. An integrated circuit for managing generation of metadata, comprising:
a non-transitory memory device that stores a program; and
a processor that executes the program and causes the integrated circuit to operate as:
a count unit that measures a playback amount of content, which is an amount of content that has been played back;
a control unit that controls whether to output an instruction for generating metadata based on the playback amount of the content, the metadata being information searched for based on a request for searching for the content by a user, indicating characteristics of the content and being associated with the content;
a generation unit that performs generation processing for generating the metadata in determining the instructions is output from the control unit, wherein
the control unit includes processing level information in the instruction and outputs the instruction, the processing level information indicating that first level processing is to be performed in determining the playback amount of the content is less than a predetermined playback amount, and indicating the second level processing is to be performed in determining the playback amount is greater than or equal to the predetermined playback amount, the second level processing requiring a large processing amount than the first level processing, and
the generation unit performs, as the generation processing of the metadata, one of the first level processing and the second level processing indicated by the processing level information in the instruction output from the control unit.

13. A metadata generation management method used in a metadata generation management device, comprising:
a measuring step of measuring a playback amount of content, which is an amount of content that has been played back;
a control step of controlling whether to output an instruction for generating metadata based on the playback amount of the content, the metadata being information searched for based on a request for searching for the content by a user, indicating characteristics of the content and being associated with the content and
a generation step of performing generation processing for generating the metadata in determining the instruction is output from the control step, wherein
the control step includes processing levels information in the instruction and outputs the instruction, the processing level information indicating that first level processing is to be performed in determining the playback amount of the content is less than a predetermined playback amount, and indicating that second level processing is to be performed in determining the playback amount is greater than or equal to the predetermined playback amount, the second level processing requiring a larger processing amount than the first level processing, and
the generation step performs, as the generation processing of the metadata, one of the first level processing and the second level processing indicated by the processing level information in the instruction output from the control step.

14. A non-transitory computer-readable recording medium storing a program for causing a computer to perform metadata generation management processing, the program causing the computer to perform steps comprising:
a measuring step of measuring a playback amount of content, which is an amount of content that has been played back;
a control step of controlling whether to output an instruction for generating metadata based on the playback amount of the content, the metadata being information searched for based on a request for searching for the content by a user, indicating characteristics of the content and being associated with the content; and
a generation step of performing generation processing for generating the metadata in determining the instruction is output from the control step, wherein
the control step includes processing level information in the instruction and outputs the instruction, the processing level information indicating that first level processing is to be performed in determining the playback amount of the content is less than a predetermined playback amount, and indicating that second level processing is to be performed in determining the playback amount, and indicating that second level processing is to be performed if the playback amount is greater than or equal to the predetermined playback amount, the second level processing requiring a larger processing amount than the first level processing, and the generation step performs, as the generation processing of the metadata, one of the first level processing and the second level processing indicated by the processing level information in the instruction output from the control step.

15. A metadata generation management device, comprising:

a non-transitory memory device that stores a program; and a processor that executes the program and causes the metadata generation management device to operate as:

a count unit that measures a playback amount of content, which is an amount of content that has been played back;

a control unit that controls whether to output an instruction for generating metadata based on the playback amount of the content, the metadata being information searched for based on a request for searching for the content received from a terminal device, indicating characteristics of the content and being associated with the content; and a generation unit that performs generation processing for generating the metadata in determining the instruction is output from the control unit, wherein the control unit includes processing level information in the instruction and outputs the instruction, the processing level information indicating that first level processing is to be performed in determining the playback amount of the content is less than a predetermined playback amount, and indicating that second level processing is to be performed in determining the playback amount is greater than or equal to the predetermined playback amount, the second level processing requiring a larger processing amount than the first level processing, and the generation unit performs, as the generation processing of the metadata, one of the first level processing and the second level processing indicated by the processing level information in the instruction output from the control unit.

16. A metadata generation management method used in a metadata generation management device, comprising:

a measuring step of measuring a playback amount of content, which is an amount of content that has been played back;

a controlling step of controlling whether to output an instruction for generating metadata based on the playback amount of the content, the metadata being information searched for based on a request for searching for the content received from a terminal device, indicating characteristics of the content and being associated with the content; and a generation step of performing generation processing for generating the metadata in determining the instruction is output from the control step, wherein the control step includes processing level information in the instruction and outputs the instruction, the processing level information indicating that first level processing is to be performed in determining the playback amount of the content is less than a predetermined playback amount, and indicating that second level processing is to be performed in determining the playback amount is greater than or equal to the predetermined playback amount, the second level processing requiring a larger processing amount than the first level processing, and the generation step performs, as the generation processing of the metadata, one of the first level processing and the second level processing indicated by the processing level information in the instruction output from the control step.

\* \* \* \* \*